W. H. RAY AND P. B. PIERCE.
AUTOMATIC FIBER CONTAINER MACHINE.
APPLICATION FILED NOV. 7, 1917.

1,388,202.

Patented Aug. 23, 1921.

W. H. RAY AND P. B. PIERCE.
AUTOMATIC FIBER CONTAINER MACHINE.
APPLICATION FILED NOV. 7, 1917.

1,388,202. Patented Aug. 23, 1921.
17 SHEETS—SHEET 6.

INVENTORS
William H. Ray
Paul B. Pierce
By Arthur L. Durand
ATTORNEY

W. H. RAY AND P. B. PIERCE.
AUTOMATIC FIBER CONTAINER MACHINE.
APPLICATION FILED NOV. 7, 1917.
1,388,202.
Patented Aug. 23, 1921.
17 SHEETS—SHEET 7.
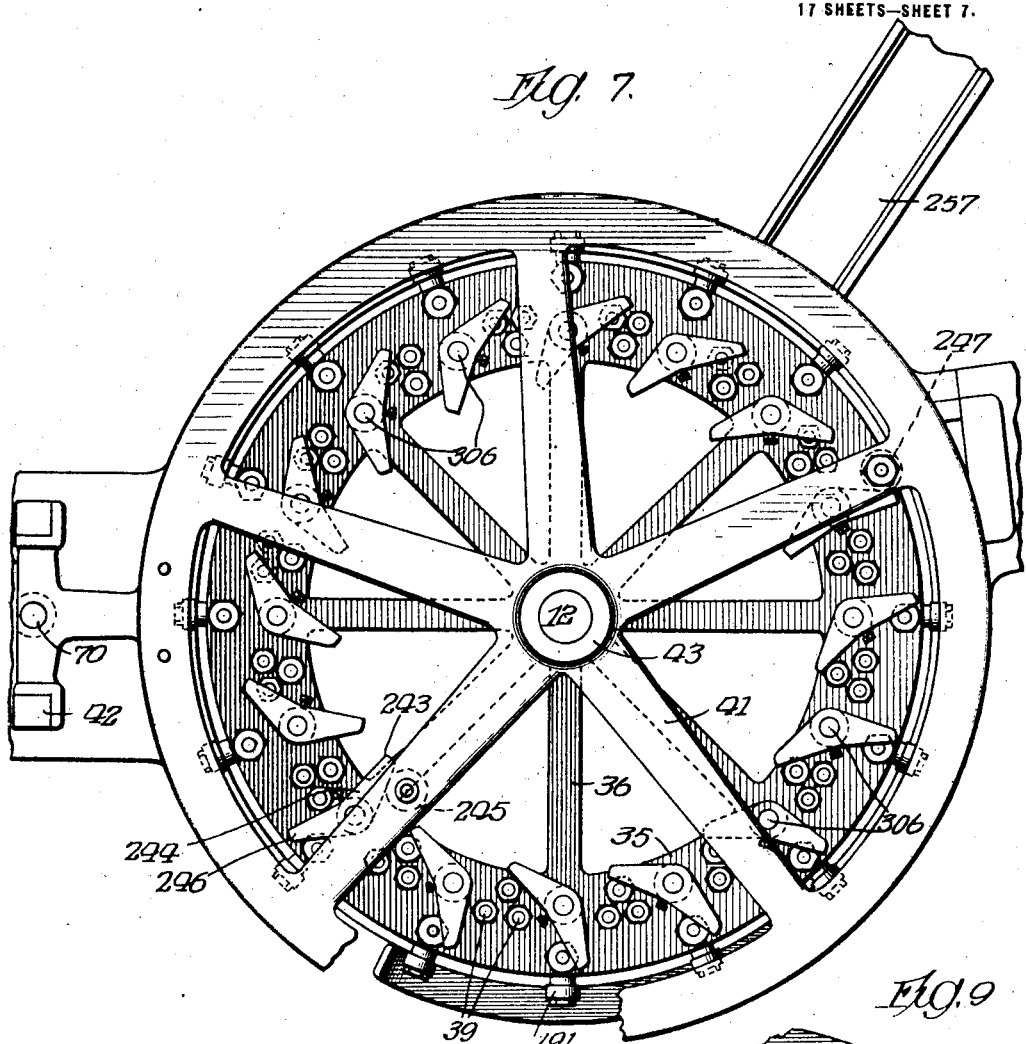
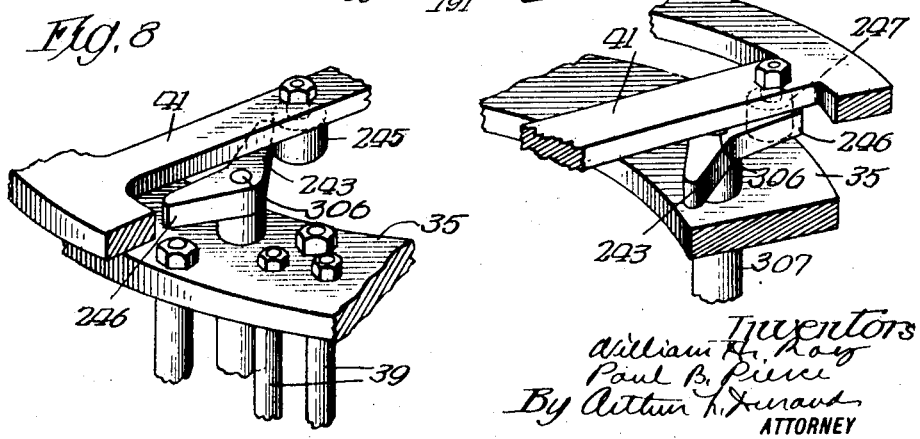

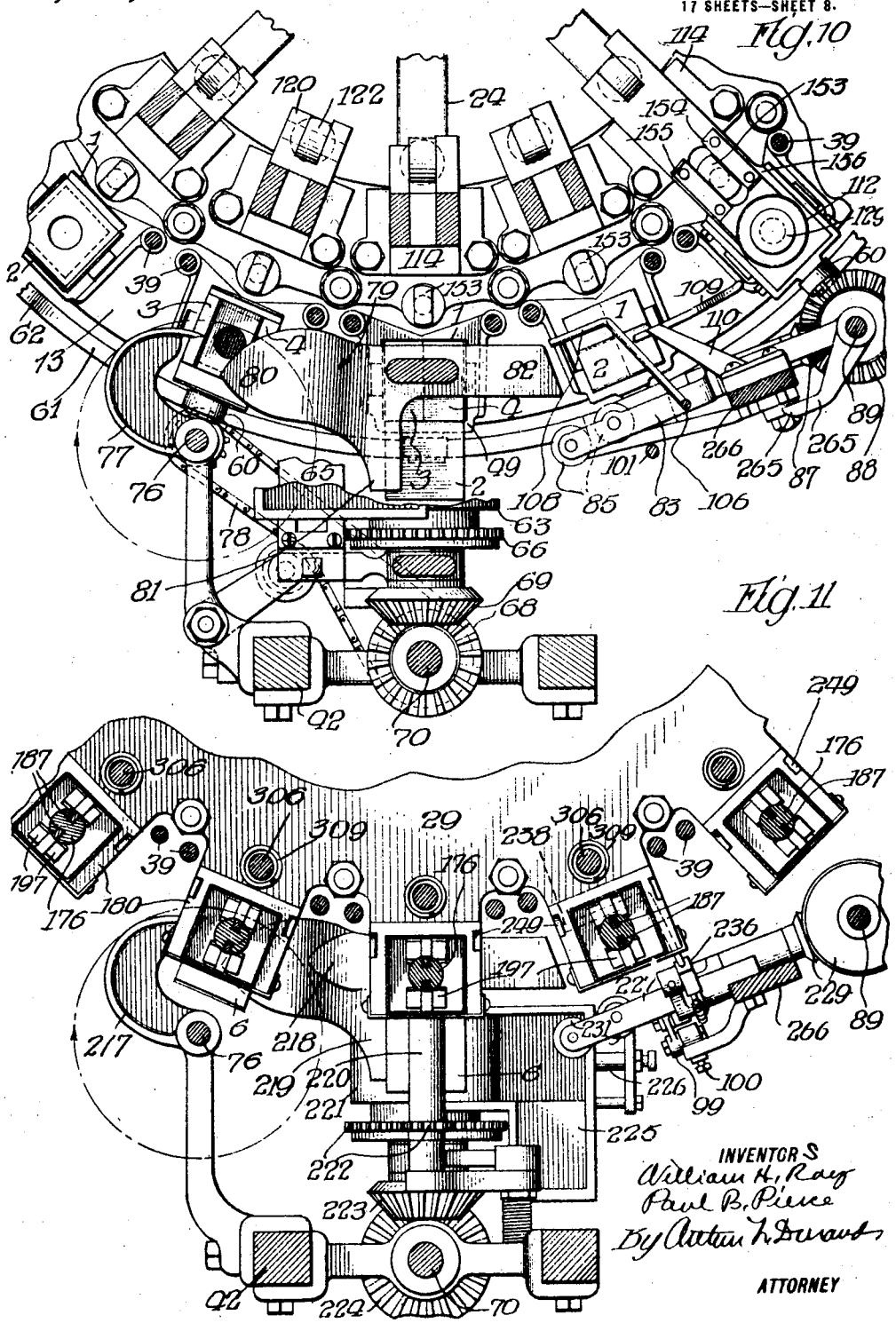

W. H. RAY AND P. B. PIERCE.
AUTOMATIC FIBER CONTAINER MACHINE.
APPLICATION FILED NOV. 7, 1917.
1,388,202. Patented Aug. 23, 1921.
17 SHEETS—SHEET 9.
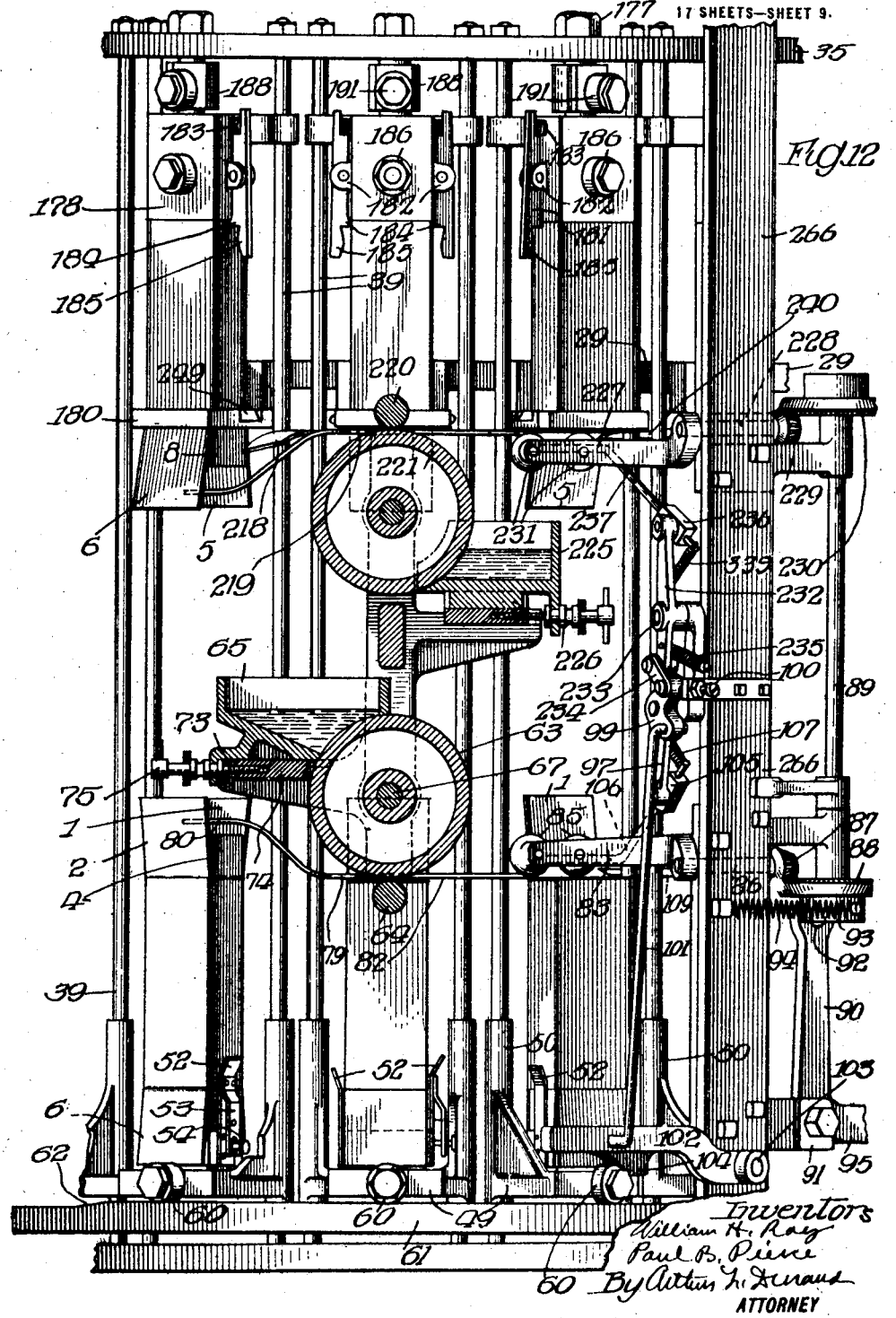

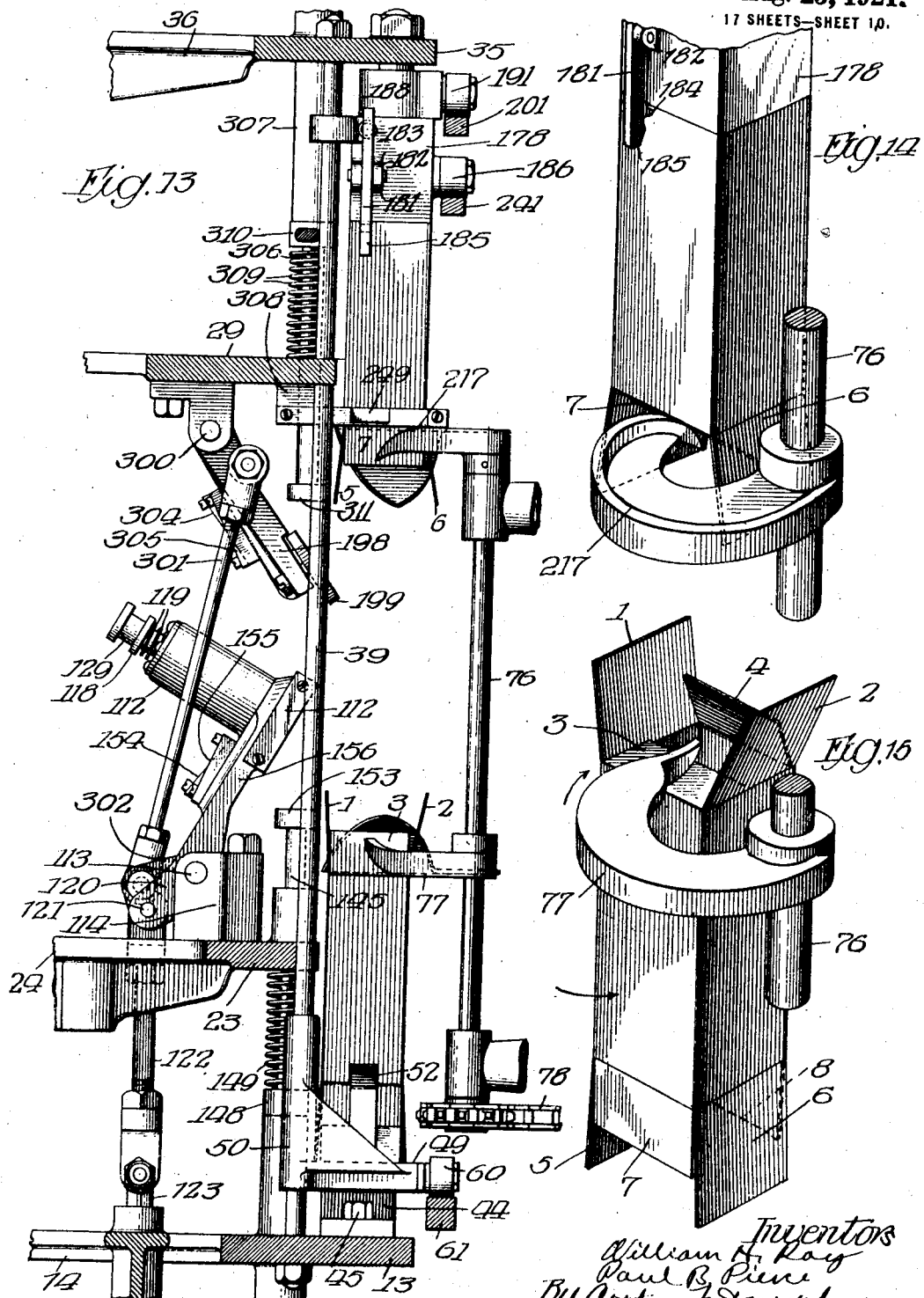

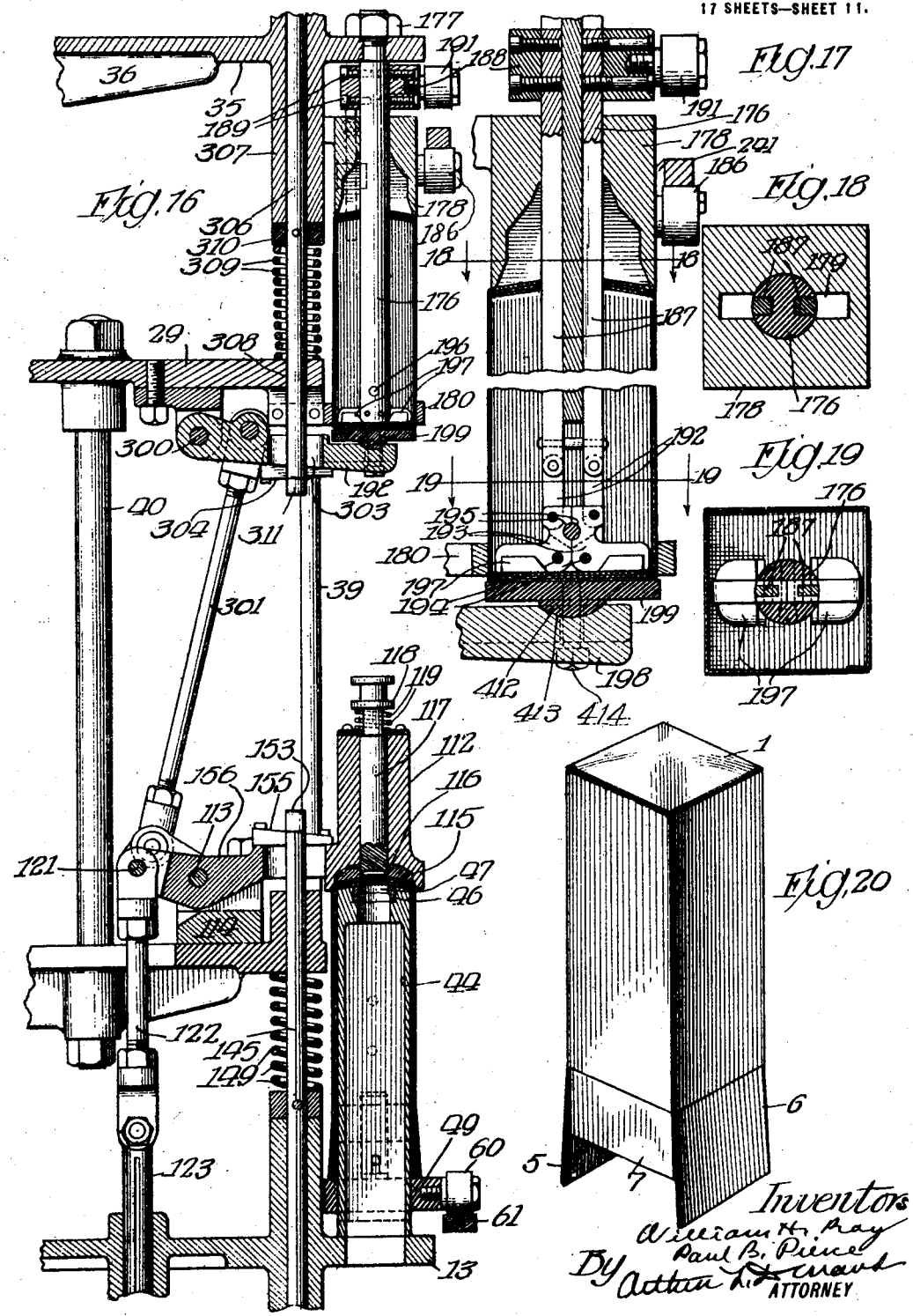

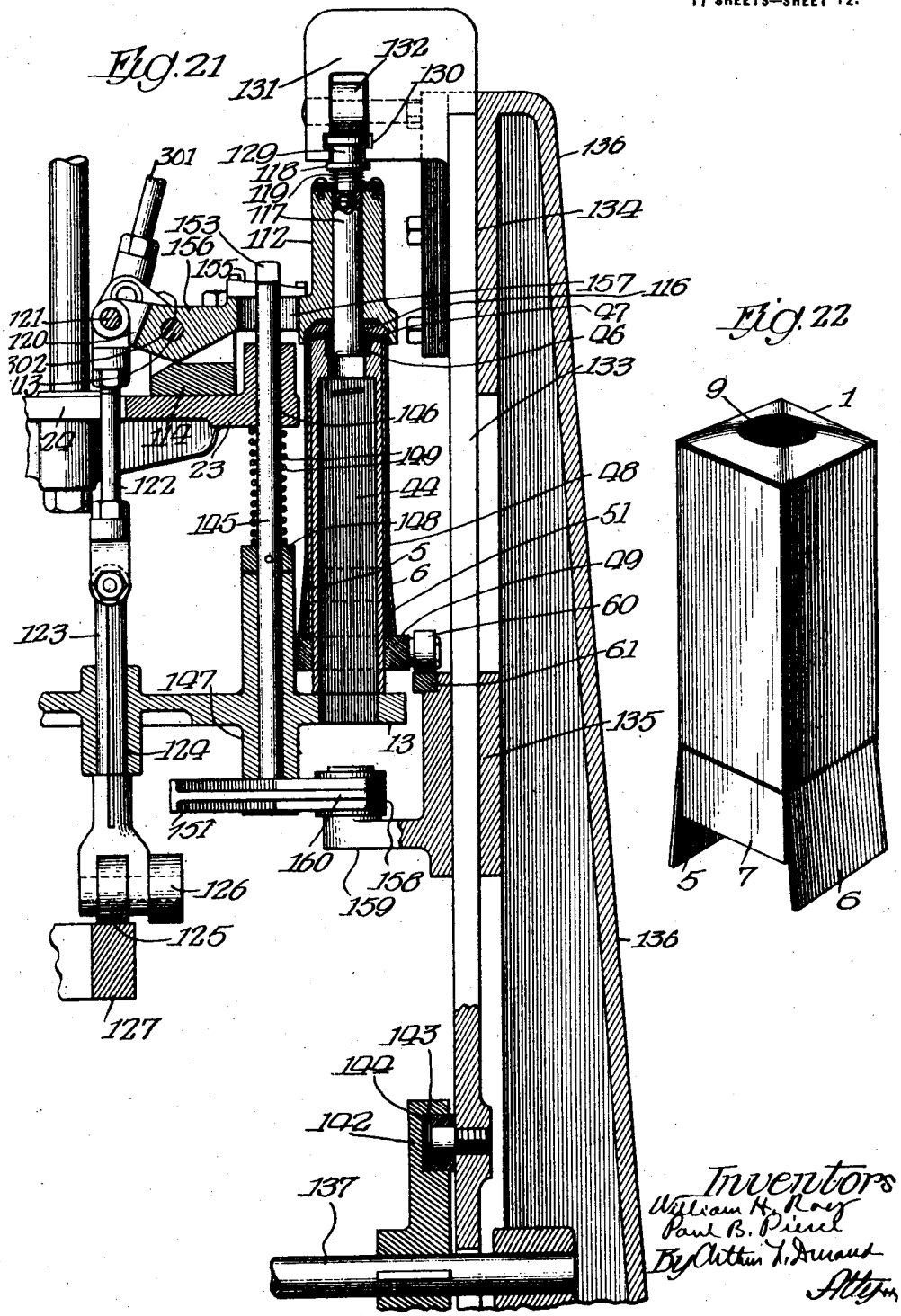

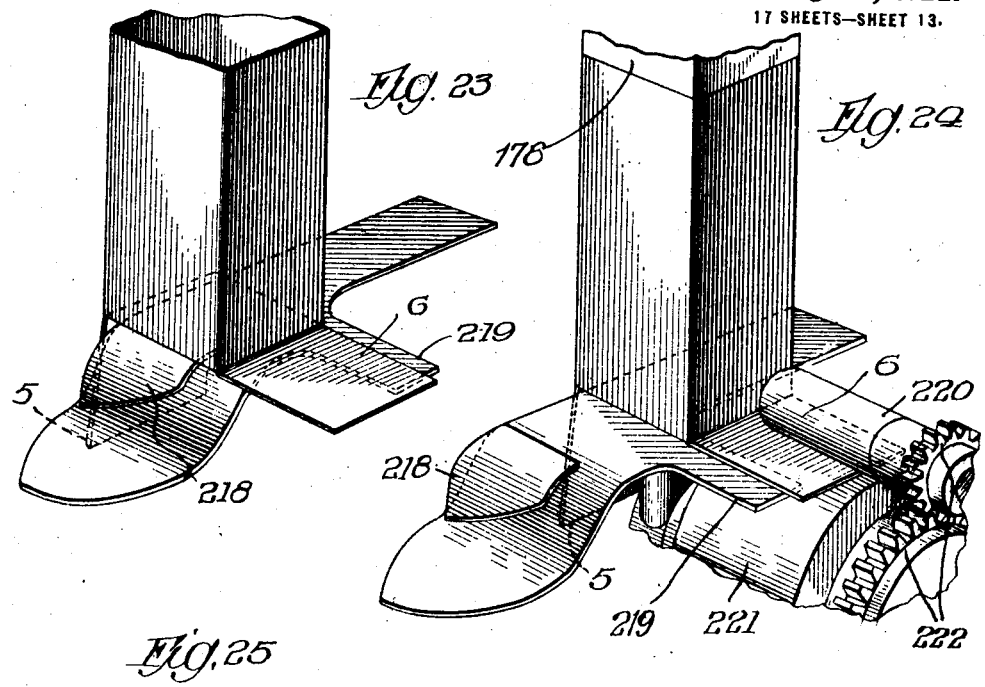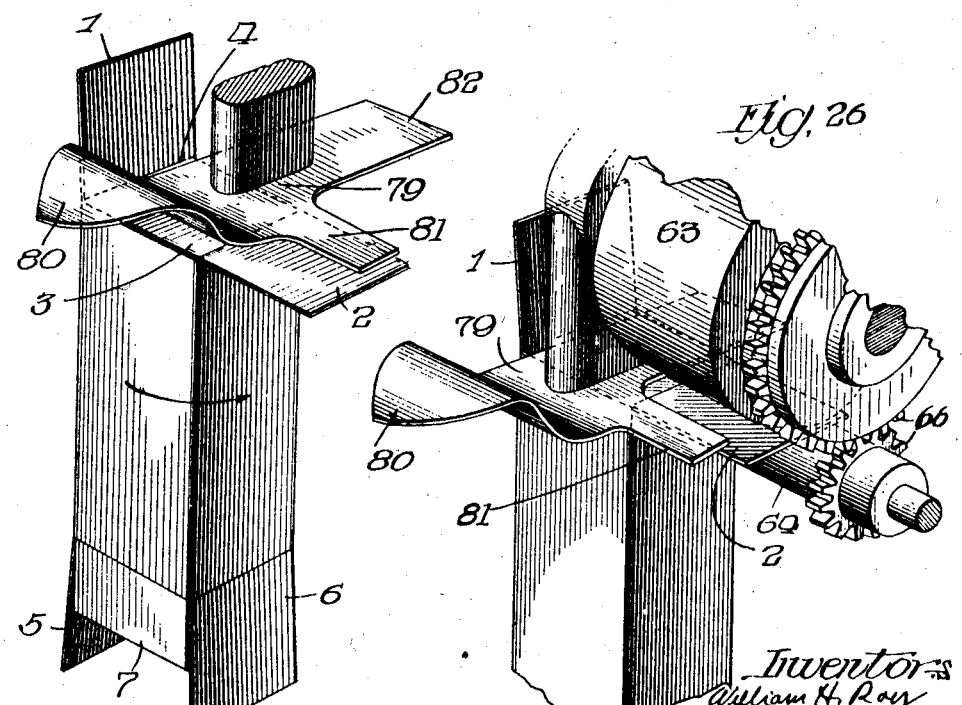

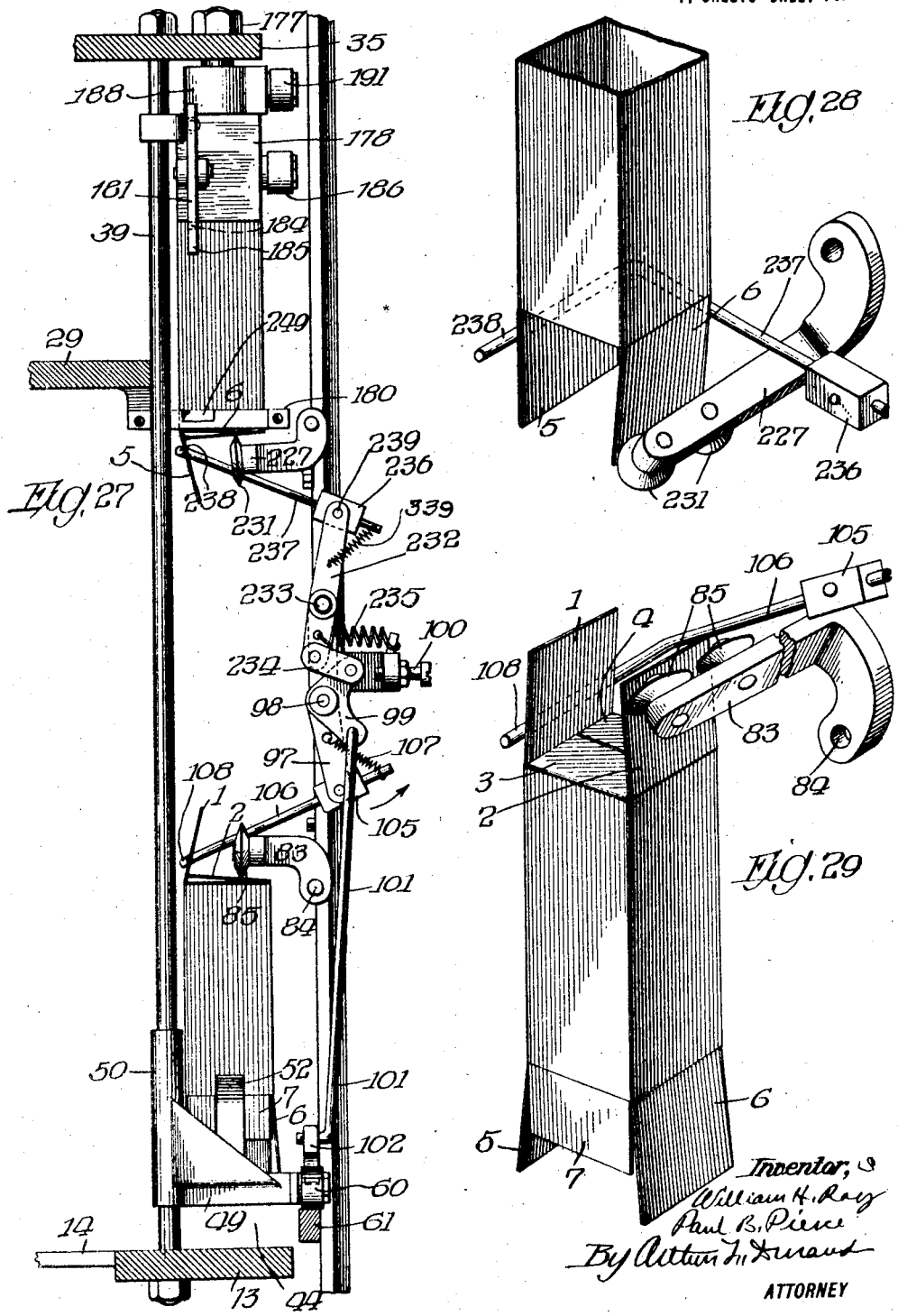

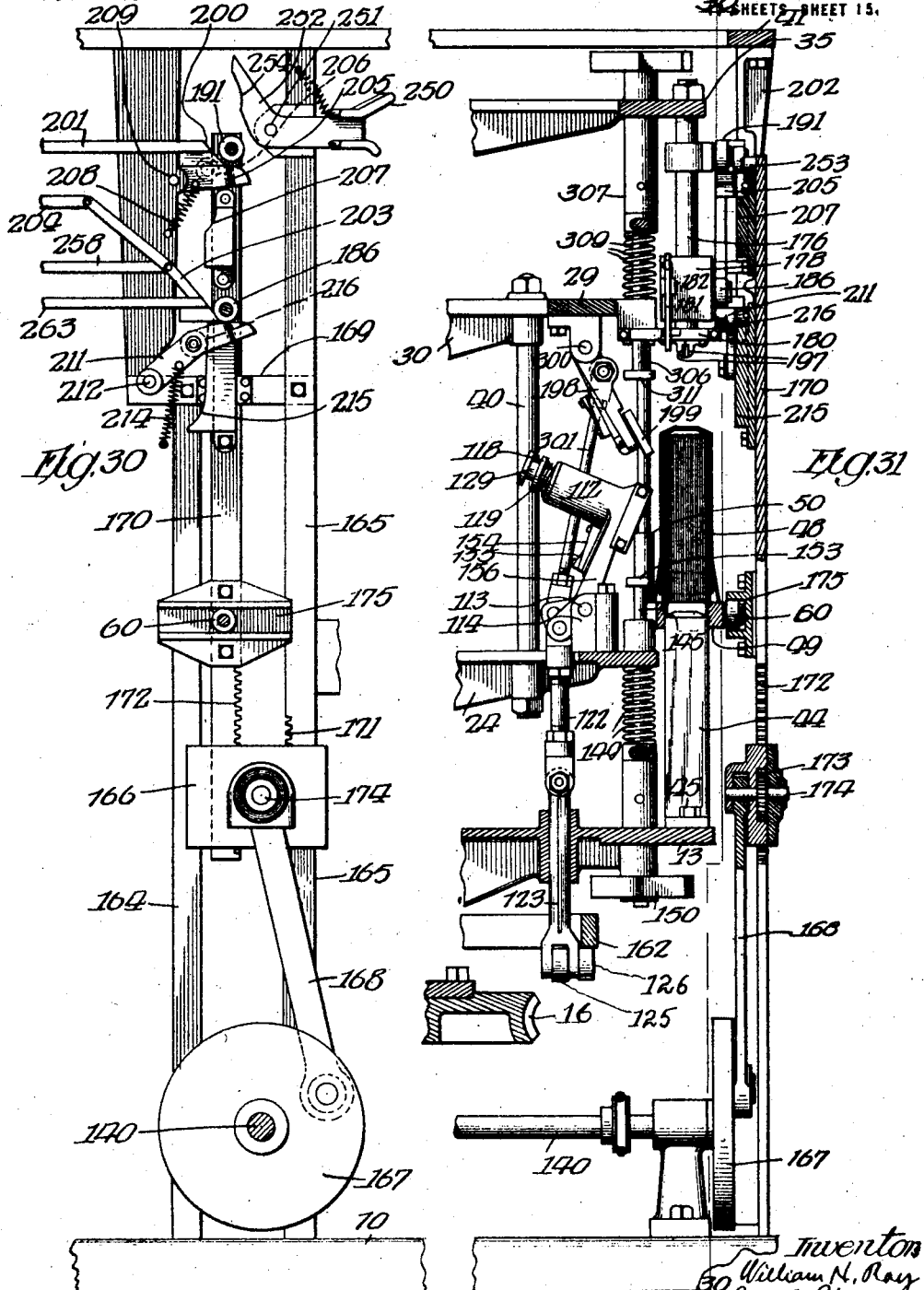

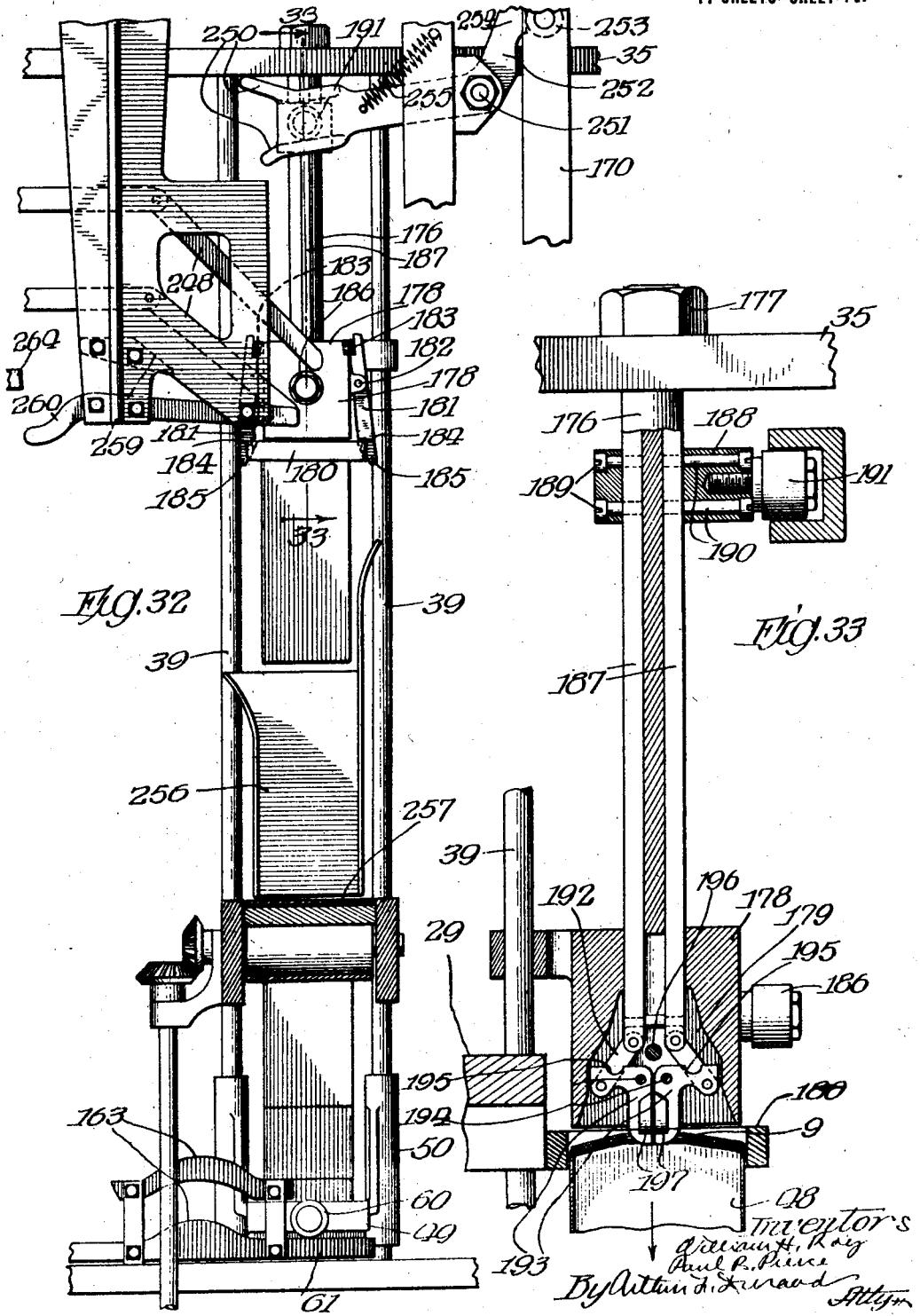

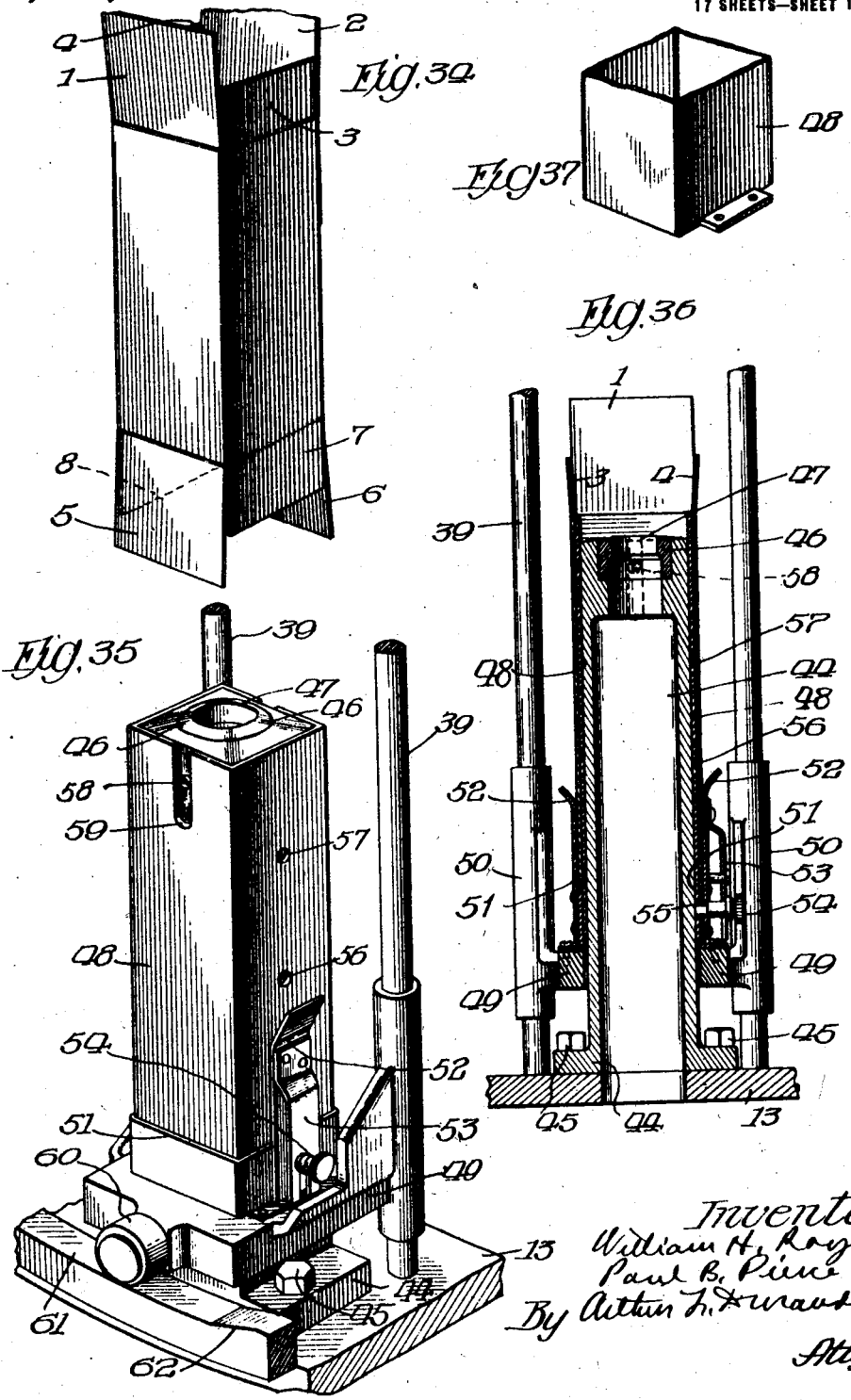

UNITED STATES PATENT OFFICE.

WILLIAM HARRY RAY AND PAUL BANCROFT PIERCE, OF MONROE, MICHIGAN, ASSIGNORS TO THE WEIS FIBRE CONTAINER CORPORATION, OF MONROE, MICHIGAN, A CORPORATION OF SOUTH DAKOTA.

AUTOMATIC FIBER-CONTAINER MACHINE.

1,388,202.   Specification of Letters Patent.   Patented Aug. 23, 1921.

Application filed November 7, 1917. Serial No. 200,849.

*To all whom it may concern:*

Be it known that we, WILLIAM HARRY RAY and PAUL BANCROFT PIERCE, citizens of the United States of America, and residents of Monroe, Monroe county, Michigan, have invented a certain new and useful Improvement in Automatic Fiber-Container Machines, of which the following is a specification.

Our invention relates to the manufacture of fiber containers of that kind in which the top is formed by one set of flaps, and in which the bottom is formed by another set of flaps, the finished container having flat sides and an opening in the top thereof, and containers of this character being commonly used for holding milk or other liquids, and for various other purposes. Prior to our invention, containers of this kind were made by first forming a blank from the proper sheet-material, then folding the blank and securing the ends thereof together to form a square tube, folding and securing the upper flaps to form the top, and finally folding and securing the lower flaps to form the bottom. These operations were performed separately by separate or independent machines, necessitating the handling of the containers between the operations, and requiring more time and labor than was necessary. This was especially true of the forming of the top and bottom of the containers, inasmuch as the upper flaps were folded and secured together in one machine, and the lower flaps were folded and secured together in a different machine.

Generally stated, therefore, the object of our invention is to provide a machine in which the operations of folding the upper flaps and the other operation of folding the lower flaps are accomplished automatically, without any necessity of handling the containers between the two operations, and whereby less time and labor will be required for the production of fiber containers of this general character.

It is also an object to provide certain details and features of construction and combinations tending to increase the general efficiency and desirability of an automatic folding and gluing machine of this particular character.

To these and other useful ends, our invention consists in matters hereinafter set forth and claimed.

In the accompanying drawings:—

Fig. 7 is a top plan view of the machine shown in Fig. 1, with a portion of the frame broken away to bring into view certain parts below.

Fig. 8 is a detail perspective view.

Fig. 9 is a similar view showing one of the elements of Fig. 8 in a different position.

Fig. 10 is a fragmentary horizontal section, on a larger scale, on line 10—10 in Fig. 3.

Fig. 11 is a similar section on line 11—11 in Fig. 3.

Fig. 12 is a vertical section, on a larger scale, on line 12—12 in Fig. 3.

Fig. 13 is an enlarged fragmentary detail view of the mechanism for folding the flaps of the container and of adjacent parts of the machine.

Fig. 14 is a perspective view illustrating the operation of one of the folding devices for folding the lower flaps of the container.

Fig. 15 is a similar view illustrating the operation of one of the folding devices for folding the upper flaps of the container.

Fig. 16 is an enlarged vertical section on line 16—16 in Fig. 2.

Fig. 17 is an enlarged sectional view illustrating the operation of the device which enters the container to bear upon the bottom and flaps thereof.

Fig. 18 is a horizontal section on line 18—18 in Fig. 17.

Fig. 19 is a horizontal section on line 19—19 in Fig. 17.

Fig. 20 is a perspective view of the container with the top flaps thereof folded, but with the bottom flaps unfolded, and showing the container before the hole is punched in the top flaps to form the mouth or opening of the container.

Fig. 21 is an enlarged vertical section on line 21—21 in Fig. 6.

Fig. 22 is a view similar to Fig. 20, but showing the condition of the container immediately after the punching of the hole in the top flaps.

Fig. 23 is a fragmentary perspective view illustrating the operation of one of the stationary folding devices by which the bottom flaps are folded.

Fig. 24 is a similar view illustrating the operation of the means for applying the glue or paste to one of the bottom flaps of the container.

Fig. 25 is a similar view illustrating one of the stationary devices for folding and manipulating certain of the top flaps of the container.

Fig. 26 is a similar view illustrating the means for applying the glue or paste to one of the top flaps of the container.

Fig. 27, is a detail side elevation, on a larger scale, of certain of the parts shown in Fig. 2 of said drawings.

Fig. 28 is a perspective view illustrating the operation of certain of the devices by which the bottom flaps of the container are folded into position.

Fig. 29 is a similar view illustrating the operation of certain of the devices for folding the top flaps of the container into closed position.

Fig. 30 is a vertical section on line 30—30 in Fig. 31.

Fig. 31 is a detail vertical section, on a larger scale, on line 31—31 in Fig. 1.

Fig. 32 is a detail front elevation, on a larger scale, of certain of the parts shown in Fig. 1, illustrating the operation of stripping the finished container from the machine and the delivery of the same through a hopper onto the conveyer-belt by which the finished containers are carried away from the machine.

Fig. 33 is a detail vertical section, on a larger scale, on line 33—33 in Fig. 32.

Fig. 34 is a perspective of the container before the top and bottom flaps thereof are folded.

Fig. 35 is a perspective of one of the forms upon which the containers are carried during the operation of folding the top or upper flaps.

Fig. 36 is a vertical section of the part shown in Fig. 35, showing the container pushed down into place on the form, so that the top or upper flaps are ready to be folded.

Fig. 37 is a perspective of the lower end of the square sleeve shown in Figs. 35 and 36.

The containers to be made are formed from blanks made of the proper sheet-material, and when the ends of the blank are folded around and fastened together, by glue or other adhesive, a substantially square tube is formed (see Fig. 34) having the top flaps 1 and 2 and 3 and 4, and the bottom flaps 5 and 6 and 7 and 8, the flaps 1 and 2 and 5 and 6 each being the same in area as the cross-sectional area of the container, but the flaps 3 and 4 and 7 and 8 being of such size that they each have about one-half of said area. After the top flaps are folded and punched to form the mouth or opening of the container, the latter then has the appearance shown in Fig. 22, the top having been finished. The bottom flaps are then folded to provide a flat bottom. Before the top flaps are punched, the container has the appearance shown in Fig. 20, the flaps 3 and 4 having been folded first into the same horizontal plane, (so that their edges meet) and the flaps 1 and 2 having been folded one upon the other, so that the top is composed of three thicknesses. The opening 9 (see Fig. 22) is then punched in the top, and after that the container passes through another operation by which the bottom flaps are folded and secured in place by adhesive.

Figure 1:
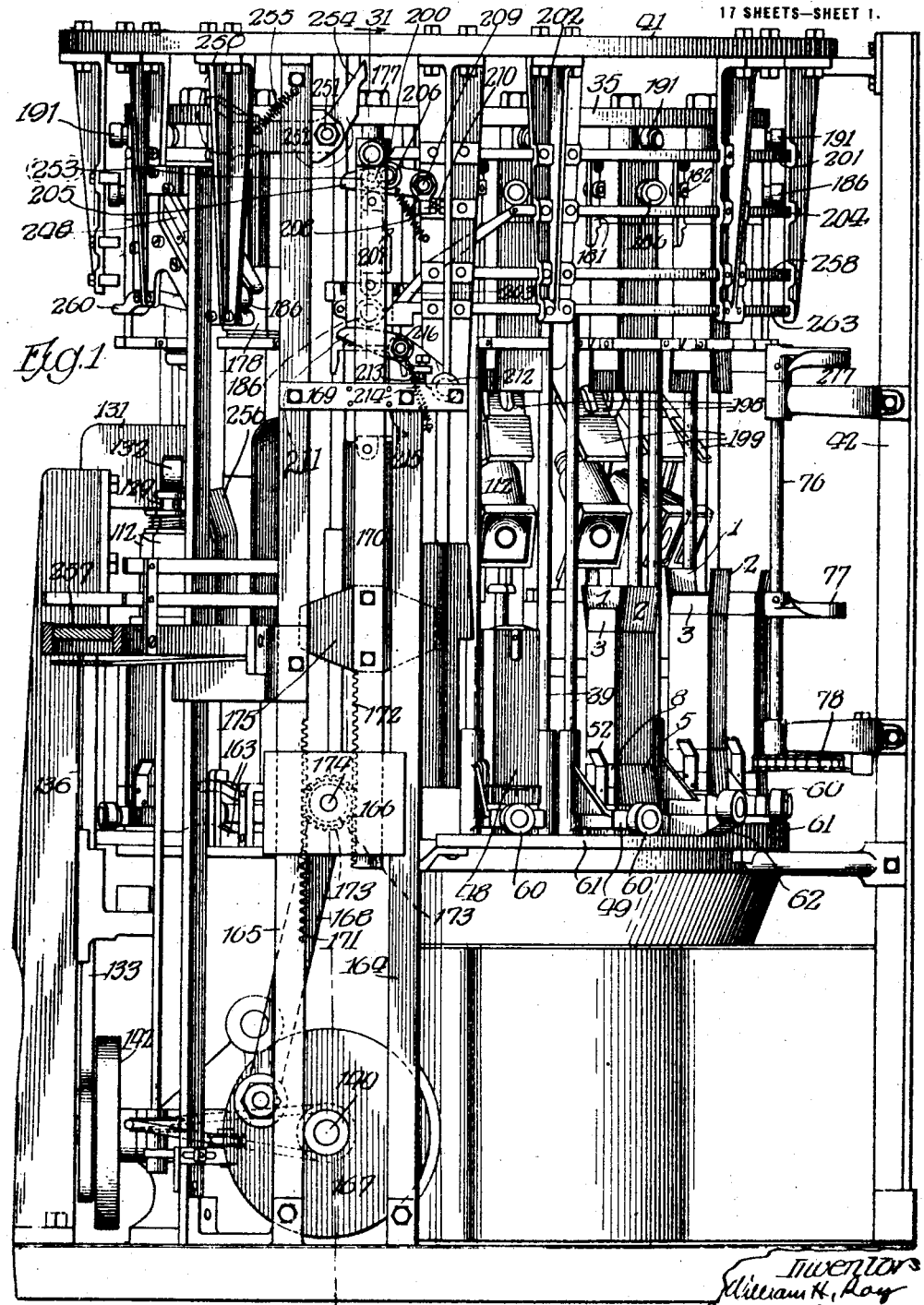
Figure 1 is a side elevation of an automatic container folding and gluing machine embodying the principles of our invention.
Figure 2:
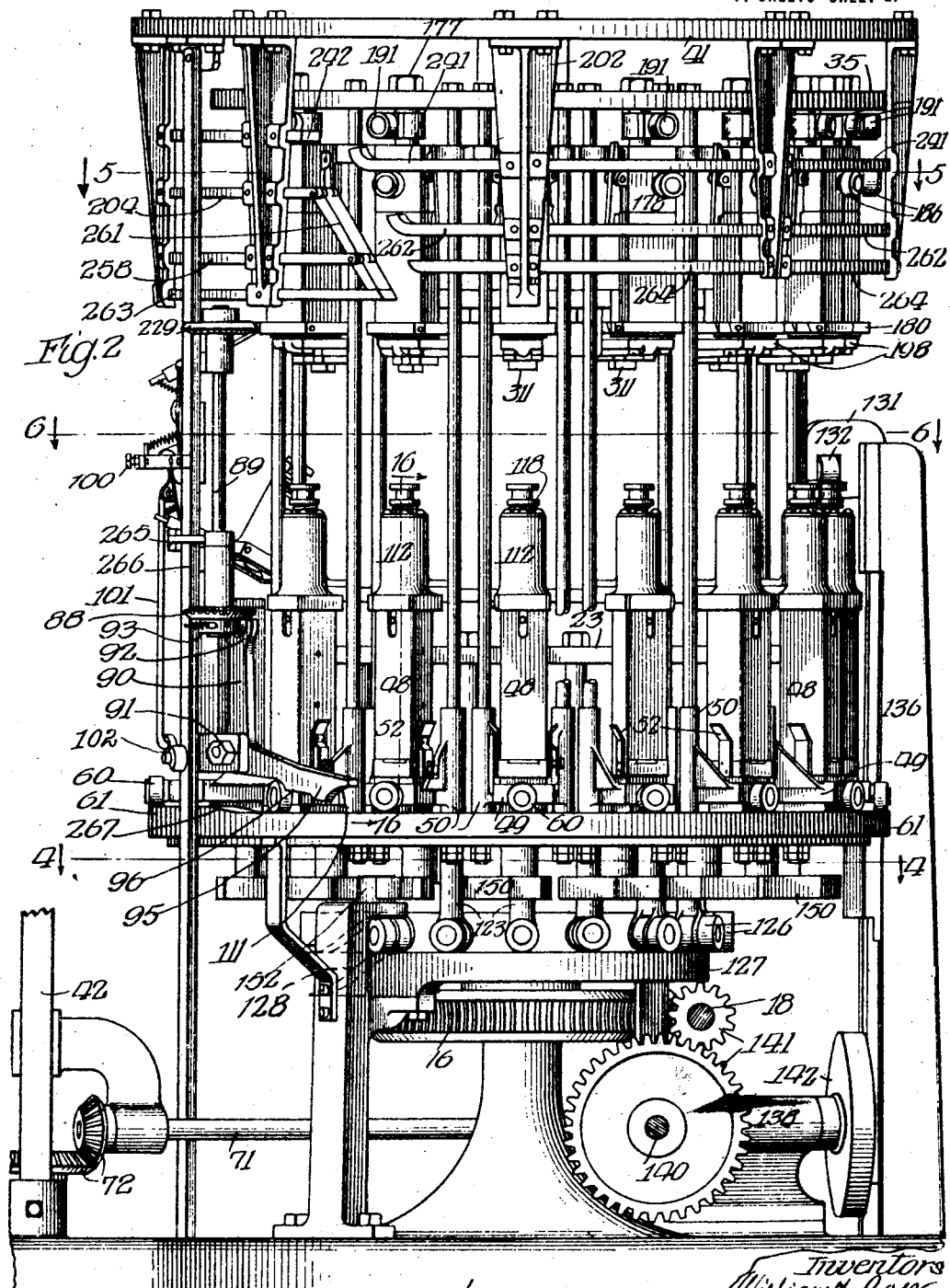
Fig. 2 is a similar view showing another side of said machine.
Figure 3:
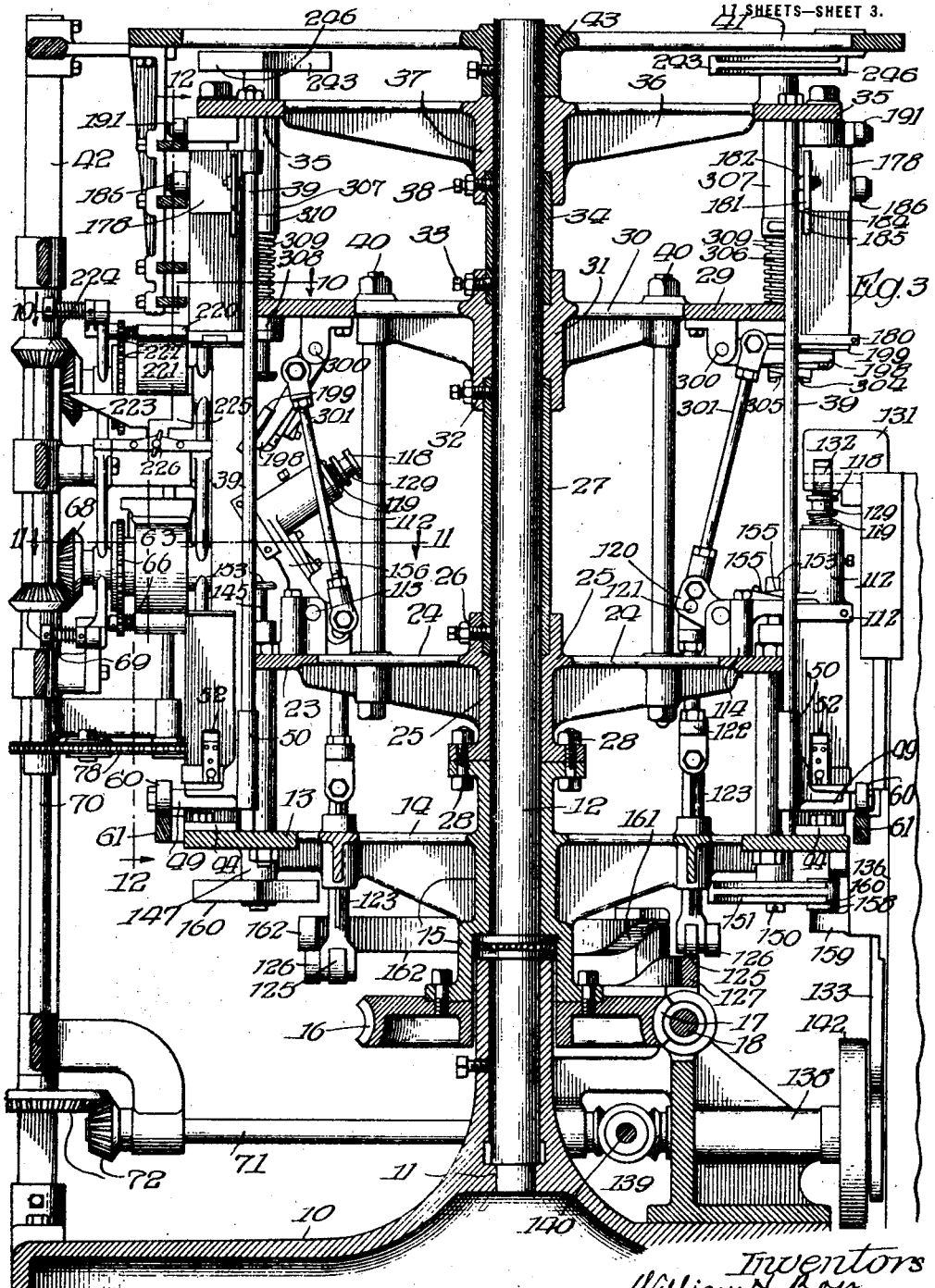
Fig. 3 is a vertical section on line 3—3 in Fig. 5.
Figure 4:
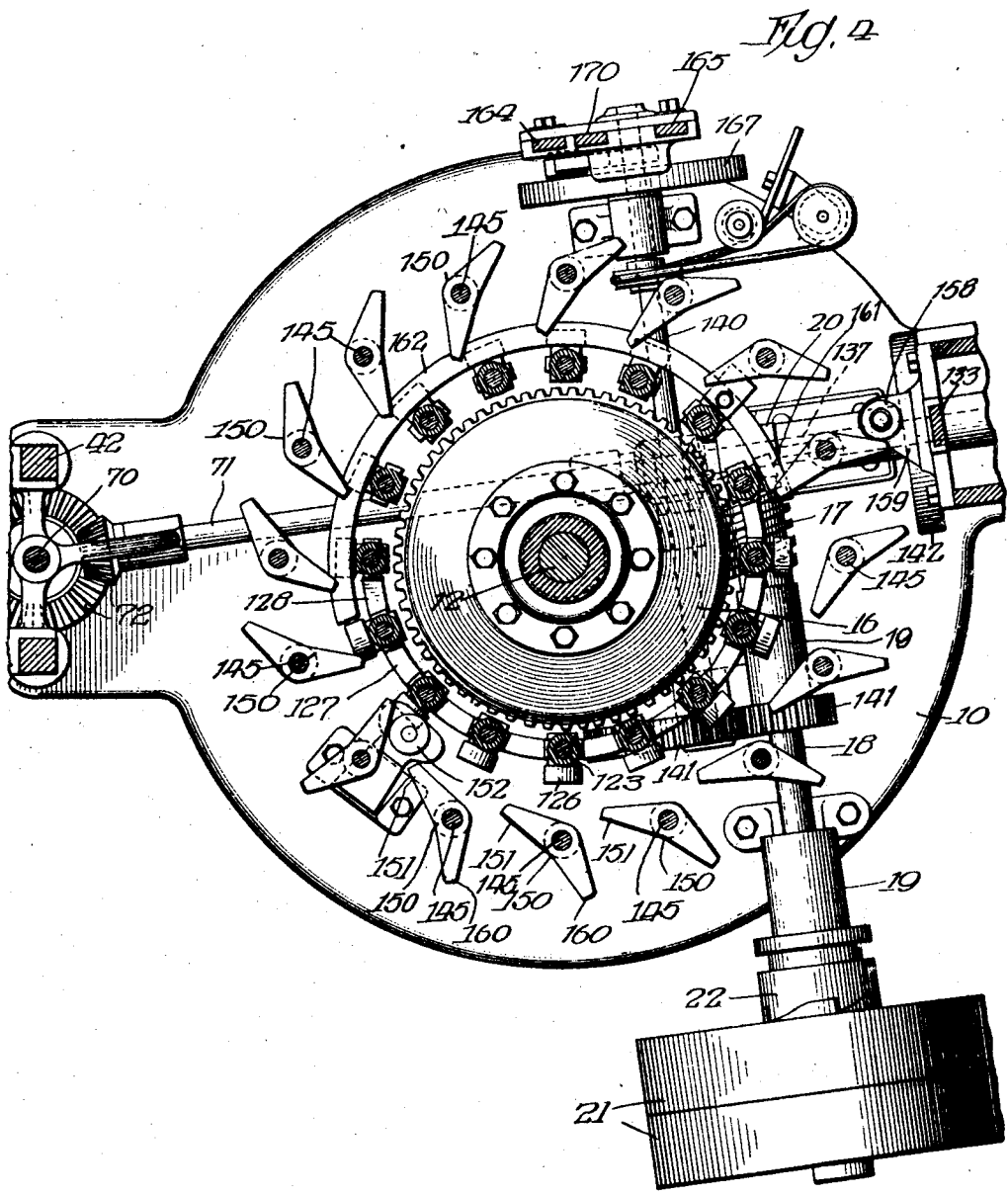
Fig. 4 is a section on line 4—4 in Fig. 2.
Figure 5:
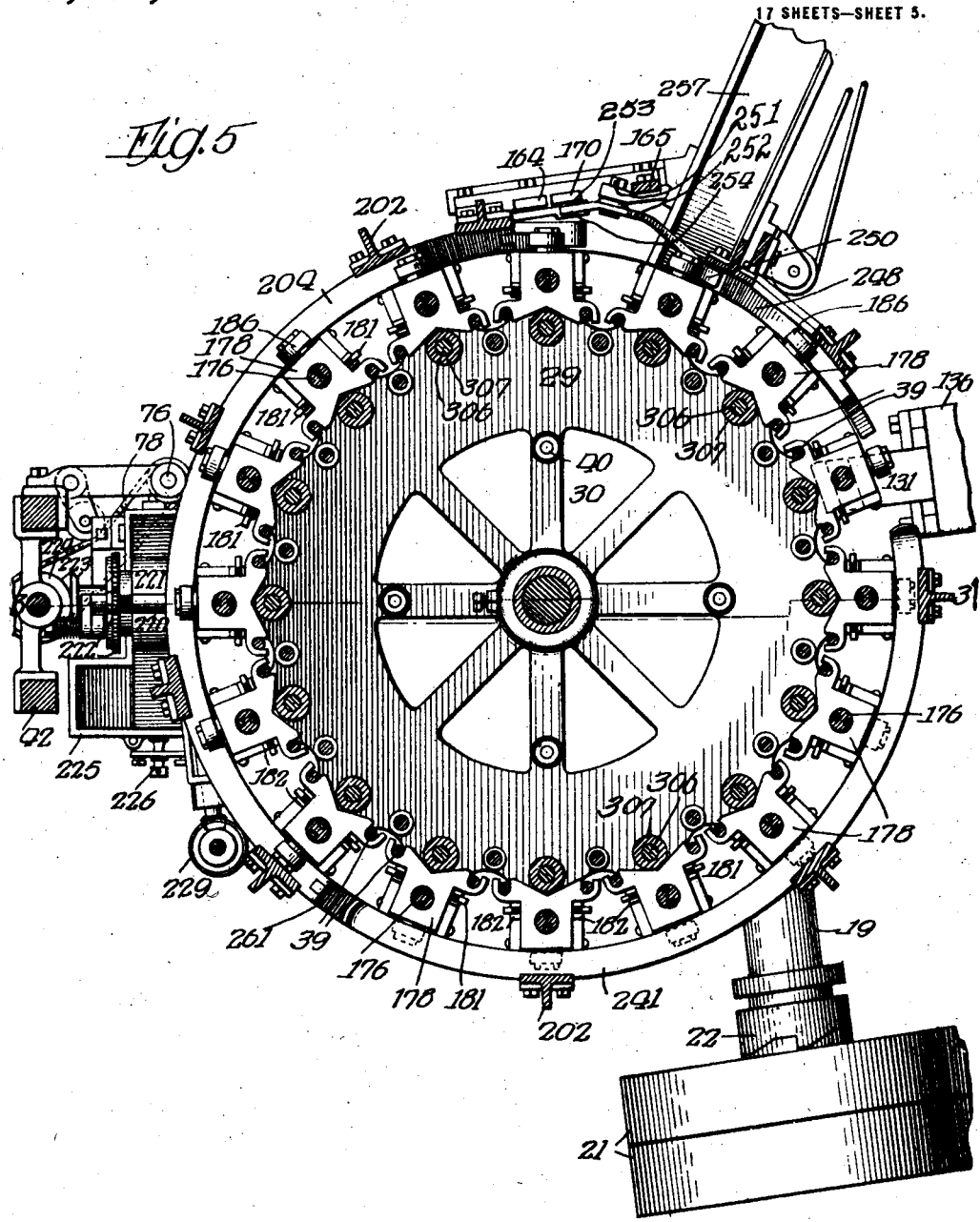
Fig. 5 is a horizontal section on line 5—5 in Fig. 2.
Figure 6:
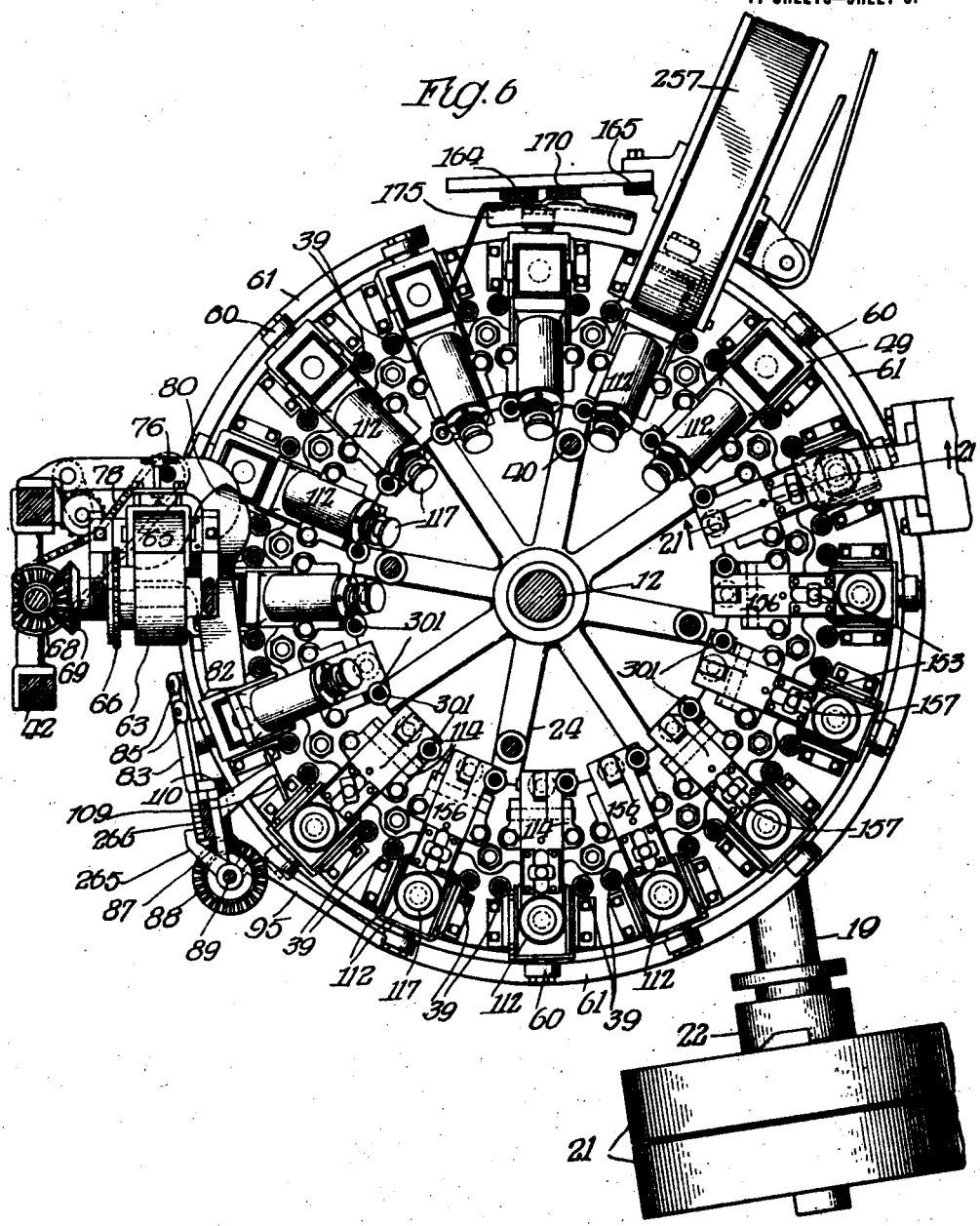
Fig. 6 is a horizontal section on line 6—6 in Fig. 2.

As illustrated, the machine is constructed and operated on the rotary or turn-table principle, and comprises a base 10 provided with a thrust-bearing 11 for the vertically disposed shaft 12, which latter forms the axis of the machine. A ring 13 is provided with arms 14 which converge to a sleeve 15, the latter being provided at its lower end with a worm-wheel 16 which is engaged by the worm 17 on the shaft 18, the latter being mounted horizontally a distance above the base 10, and supported in suitable bearings 19 and 20, the outer end of this shaft being provided with pulleys 21 and a clutch 22 for driving the machine. A ring 23 is provided with arms 24 that converge to the sleeve 25, the latter being secured by set-screws 26 to the sleeve 27 which rotates on the shaft 12, and the lower end of the sleeve 25 having bolts 28 by which it is secured to the upper end of the sleeve 15, whereby these sleeves rotate in unison on the shaft 12. A ring 29 is provided with arms 30 that converge to a sleeve 31, this sleeve being secured by set-screws 32 to the upper end of the sleeve 27, and by set-screws 33 to the lower end of the sleeve 34, which latter rotates on the stationary shaft. The rings 23 and 29 are of substantially the same diameter, but are of less diameter than the ring 13 (see Fig. 3), and the ring 35 is slightly less in diameter than the ring 13; but these rings are all concentric to the axis of the machine, the ring 13 being disposed at the bottom, the ring 23 a distance above, the ring 29 a distance above the ring 23, and the ring 35 being disposed at the top. This ring 35 is provided with arms 36 which converge to the sleeve 37 on the vertical shaft 12, the lower end of this sleeve being secured by set-screws 38 to the upper end of the sleeve 34. The vertical rods 39 are arranged in pairs and serve to rigidly connect the upper ring 35 and the lower ring 13, thus forming a cylindric cage which rotates during the operation of the machine. The arms 24 are connected with the arms 30 by means of vertical bolts 40, whereby these bolts and the two rings 23 and 29 form a part of said rotary cage, the entire structure being strong and rigid and adapted for rotation by the worm-gearing 16 and 17 previously described. A stationary spider 41 is mounted at the top of the machine, upon the upright frame 42, which latter comprises a suitable number of uprights disposed outside of the operative parts of the machine and supported at their lower ends upon the base 10 previously described. This spider 41 is provided with a central sleeve 43 which is fastened with a set-screw to the upper end of the shaft 12, whereby the latter is held rigidly upright to support the cage formed by the various rings and the rods 39 in suitable position for rotation. For each pair of rods 39, there is a form 44 which is mounted on the ring 13, by bolts 45, the form being positioned outside of said rods and about midway between them (see Figs. 35 and 36), so that each form extends upward adjacent its allotted pair of rods. Each form 44 is preferably square in horizontal cross-section, and is provided at its upper end with a die 46 forming an opening 47, and the top of the form slopes away from this opening, so that the top is substantially convex in form, and is provided with said opening in the center thereof. (This opening receives the punch by which the hole is punched in the top of the container, as will hereafter more fully appear.) With the construction shown and described, there are sixteen of these forms 44, there being sixteen pairs of rods 39, and the forms are spaced equally around the ring 13, so that they occur at regular intervals around the outside of the cage. Each form is provided with a square sleeve 48 which is free to slide up and down on the form, and which has its lower end secured to the cross-head 49, the latter having tubular sleeves 50 that slide up and down on the rods 39. Each sleeve 48 has its lower end provided with a squared ring or band 51 which forms a shoulder to support the container, the sleeve fitting the interior of the container, so that the lower edges of the flaps 7 and 8 rest on said shoulder. Each ring or band 51 is provided with a pair of oppositely-arranged spring-guards 52 that guide the flaps 7 and 8 of the container, when the latter is adjusted in position on the sleeve, these spring-guards being secured to the ring or band 51, which latter is in the form of a square band extending around the lower portion of the sleeve, whereby this band 51 can be raised and lowered on the sleeve 48 for containers of different heights. One of the springs 52 has a downwardly extending portion 53 provided with a thumb-piece 54, the latter having its inner end adapted to engage the holes 55, 56 or 57 in the sleeve 48, to hold the band 51 at the desired height, depending upon the size or height of the containers to be made. The thumb-piece 54 can be pulled outward, against the tension of the spring 53, to release it from any one of said holes, so that the band 51 can be easily raised or lowered. A screw 58 is inserted through the upper end of the form to removably hold the die 46 in place, and the sleeve 48 preferably has slots 59, as will hereinafter more fully appear. The outer side of the cross-head 49, of each pair of rods 39, is provided with a roller 60 for engaging the curved track 61 that extends around the machine, and which has a bevel 62 up which the roller travels in passing from the low portion of the track to the high portion thereof preliminary to the gluing operation, as will hereinafter more fully appear. The rotary cage comprising the vertical rods 39 rotates so that, when the machine is viewed from the front (see Fig. 1), the forms 44 travel to the right, and in this way the containers which have been placed on the sleeves 48 of these forms slowly approach the gluing mechanism or devices, which are as follows:

The frame of the machine, at a point to the right in Fig. 1, is provided with upper and lower glue-rolls 63 and 64, which are mounted to rotate about horizontal axes extending crosswise or practically at right-angles to the circular path of travel of the containers. The receptacle 65, suitably mounted on the body-frame of the machine, is arranged adjacent the top of the roll 63, so that the surface of this roll is in contact with the glue or other adhesive held in said receptacle. Obviously, however, any suitable means can be employed for delivering the glue or other adhesive to this glue-roll, which latter is preferably much larger than the lower roll 64 (see Fig. 12). These rolls are geared together by gear-wheels 66, and the shaft 67 of the upper roll 63 is driven by a bevel-gear 68 which engages the bevel 69 on the vertical shaft 70, the latter being mounted in suitable bearings on the body-frame of the machine and driven by the horizontal shaft 71 through the medium of the bevel-gears 72, the power-transmitting-connection thus provided being adapted to drive the glue-rolls at the desired speed. The receptacle 65 is mounted to slide toward and away from the roll 63, and its adjustment in this respect is effected by means of the screw 73 which is threaded in the stationary portion 74 of the machine and has a swivel connection with the receptacle, whereby rotation of this screw by means of its outer end-portion 75 will cause said receptacle to move toward and away from the glue-roll, thereby to regulate the supply of glue to the rolls. At the right-hand side of the machine (see Fig. 1) there is a vertical shaft 76 upon which is mounted the folding device 77 (see Fig. 15), and this shaft is rotated so that the device 77 approaches the forwardly moving container from the rear, and whereby the rounded or up-turned end-portion of the device 77 presses down and then slides over one of the short flaps of the top of the container, as the latter approaches the glue-rolls, and then throws one of the long flaps outward, whereby the short flap 3 and the long flap 2 are brought into the same horizontal plane. The shaft 76 is driven by a sprocket-belt 78 at the lower end thereof, which belt is in turn driven by the shaft 70, the transmission of power being of such character that the device 77 rotates at the desired speed, and in a manner to operate upon the top of each of the passing containers. After being operated upon by the device 77, in the manner explained, the container then passes under the guard 79, which latter is suitably mounted upon a stationary portion of the body-frame of the machine, with its flat bottom in a horizontal plane, and with its up-turned end-portion 80 in position to extend over the short flap 4 of the top of the container, with its edge against the inner surface of the flap 1, and in this way the flap 4 is bent inward and downward until it is in the horizontal plane of the flap 3 (see Fig. 25), but during this time the flap 2 is held in its horizontal position by the projection 81 which extends laterally from one edge of the device 79 for this purpose. The device 79, it will be seen, is disposed just a little ahead of the glue-rolls 63 and 64, and before the flap 2 passes out from under the projection 81, and before the flaps 3 and 4 pass out from under the rear end-portion 82 of the device 79, the said flap 2 enters between the rolls 63 and 64, so that both the upper and lower surfaces of this flap are thereby coated with glue or other adhesive. The rolls 63 and 64 rotate at such a speed that their surfaces travel at about the same speed that the container travels, so that the flap 2 travels forward in the desired manner between the two rolls. Glue or other adhesive is applied by the roll 64, as well as by the rolls 63, for the reason that these two rolls are in engagement with each other when no flap is passing between them, so that glue or adhesive from the roll 63 is delivered to the surface of the roll 64, which takes place immediately after each container passes the glue-rolls. The movable folding device 83 is pivoted on the body-frame of the machine at 84, and is provided with a pair of thin-edged rollers 85, which are arranged tandem, so that these rollers will bear with their edges upon the flap 2, after the container has passed the glue-rolls. The pivot 84 is formed by a horizontal shaft 86 and provided at its end with a bevel-pinion 87 which engages the bevel-gear 88 on the vertical shaft 89, which latter is mounted in suitable bearings on the stationary body-frame of the machine. This shaft 89 is oscillated by the bell-crank 90, which latter is pivoted on the stationary body-frame at 91, and which is provided at its upper end with a fork 92 which engages the laterally projecting pin on the collar 93 at the lower end of said shaft. A spring 94 connects this collar with the stationary body-frame, so that this spring by its contraction serves to automatically swing the device 83 back into its normal position, by the rotation of the shaft 89, so that the device 83 assumes its normal position (which is outward a distance from the position shown in Fig. 29), and is thus ready to operate upon the approaching container. The bell-crank 90 has its lower arm 95 provided with a cam-portion 96 for engaging the rollers 60 (previously described) that travel around with the cage or turn-table of the machine. Thus, whenever a roller 60 passes under the arm 95, the bell-crank 90 is operated to oscillate the shaft 89 in a direction to cause the device 83 to move downward, so that the flap 2 of the container which is some distance behind the roller which thus raises the arm 95 is pressed downward by the rollers 85, upon the flaps 3 and 4 (see Figs. 12 and 27), thereby causing the glued flap to adhere to the two short flaps. On the adjacent stationary portion of the body frame, an arm 97 is pivoted at 98, this arm being rigid with the bell-crank-lever 99, which latter is also mounted to rock on said pivot. An adjustable stop 100 is provided for engaging the upper end of the bell-crank-lever 99, to limit the movement of the latter in one direction, and the lower end of this bell-crank is provided with a depending rod 101 which has its lower end pivotally connected with the horizontally-disposed lever-arm 102, the latter being pivoted at 103 on the said stationary portion of the body-frame. As shown, this arm 102 is provided with a depending cam-portion 104 for engaging the rolls 60, so that each time one of these rolls passes under the lever-arm 102 the bell-crank 99 is rocked to swing the lower end of the arm 97 outward. This arm 97 is provided at its lower end with a pivoted block 105 in which is mounted a rod 106, the outer end of this rod being connected by a spring 107 with the arm 97, whereby said spring serves to yieldingly hold the rod 106 in its normal position, so that the finger 108 at the inner end of said rod, which is formed by bending this end of the rod at right-angles, is maintained in position to act on the outer surface of the flap 1 of the top of the container. As soon as the flap 2 has been pressed downward by the device 83, the lever 102 is raised by one of the rollers 60 (the one on the cross-head 49 of the form on which this particular container is carried), and this causes the rod 101 to move upward, which in turn causes the arm 97 to swing outward, thereby pulling the folding finger 108 against the outer surface of the flap 1, whereby the latter is depressed upon the glued outer surface of the flap 2, in a manner that will be readily understood. The container continuing to move forward (in unison with all the other containers on the other forms of the machine), the top of this container, with its flap 1 resting upon the glued flap 2, passes under the stationary element 109, which latter is mounted upon an arm 110 secured to the adjacent stationary portion of the body-frame. This element 109 is shaped to relatively slide upon the top of the flap 1, to hold the latter down, so that the flaps are thus maintained in closed relation to each other. Preferably, the arm 95 has its cam-portion 96 formed in such manner (see Fig. 2) that this arm 95 is given two successive upward movements by each roller 60, so that the device 83 is first moved forward and downward a distance, and then moved downward a little farther, before the roller 60 passes out from under the arm 95, whereby the glued flap is partly folded and then held until the container advances far enough to permit complete folding of the flap by the final action of the cam 96, the operation of which latter is in two stages. Also, it will be seen that the rollers on the device 83 are so positioned thereon that the glued flap 2 will fold in and not interfere with the folding of the outer flap, and will not come in contact with the end-portion 82 by which the short flaps are held down preparatory to the folding of the long flaps. Also, at this point it will be observed that the end of this arm is formed with a curved edge 111 by which the roller 60 is released gradually to permit the finger 108 to gradually assume its normal position. These folding devices are so timed in their operations, of course, that the finger or folding device 83 rises as the finger 108 moves forward to depress the flap 1, so that the flaps are folded in the desired manner, preliminary to their passage under the element 109 by which they are held down for a short distance along the circular path of travel of the container.

For each form 44 there is a pivoted clamp 112, these clamps being pivoted at 113 on the brackets 114 mounted on the ring 23, whereby each clamp 112 is arranged to swing up and down between the members of one of the pairs of rods 39, and each clamp having its under side provided with a self-adjusting plate or die 115, which latter is concave to fit the convex top of the die 46 and the top of the form 44 (see Fig. 16), so that the top of the container will be convex or bulge upward in the desired manner. Any suitable means can be provided to loosely hold this plate 115 in the bottom of the clamp, so that it will adjust itself and equalize the pressure on the top of the container. The die 115 is provided with a central opening 116 of about the same diameter as the opening 47 in the die 46, and each clamp 112 is provided with a punch 117 adapted to move downward through the opening 116, through the flaps of the top of the container, thereby punching out a round three-ply disk (see Fig. 21), and down through the opening 47, thus pushing the punched-out portion into the hollow form. Each punch 117 has a shoulder 118 at the upper end thereof, and a spring 119 is interposed between this shoulder and the top of the clamp 112, whereby these springs serve to yieldingly hold the punches 117 in their normally raised positions. Each clamp has its pivoted arm extended to form the shorter portion of the lever, the fulcrum being at 113, and this shorter portion 120 is pivotally connected at 121 with the upper end of a vertically-reciprocating rod 122, these rods 122 being disposed in position to hang downward in a circular row around the entire machine. The lower ends of these rods 122 are connected with the vertically-reciprocating rods 123, the latter being mounted in bearings 124 on the ring 13, and each rod 123 has its lower end provided with a pair of rollers 125 and 126, the two rollers being mounted to rotate about a horizontal axis. The rollers 125 are arranged in position to travel on the track 127, which is semi-circular in form and disposed at the rear side of the machine, and which has its front end provided with an incline 128 up which these rollers travel to raise the rods 123, and each time a rod 123 moves upward a clamp 112 connected thereto is depressed to clamp the top of the container which has just left the folding device. Thus clamped and held in place, the container travels around the rear side of the machine until it arrives at the left-hand side thereof, and when it arrives at this position the upper end-portion 129 of the punch passes into the correspondingly shaped recess 130 of the head 131, which latter carries a roller 132 which engages the top of said punch. The head 129 of each punch is adjustably and removably connected in any suitable manner, as, for example, by a screw-threaded connection, with the punch (see Fig. 21), so that these heads can be adjusted up and down on the punches to insure accuracy of operation. Any suitable means can be provided to limit the upward movement of each punch in its clamp 112, and to limit the expansion of the springs 119 by which the punches are normally held in raised position. This head 131 is carried at the upper end of a vertically-reciprocating slide or member 133, mounted in a guide 134 on the upright bracket 136, the latter being suitably mounted on the base 10 of the body-frame of the machine. The shaft 137 is disposed in line with the shaft 71, being mounted in the bearing 138 on the base of the machine, and is operated by bevel-gears 139, one of these gears being on a shaft 140 which extends between the adjacent ends of the shafts 71 and 137, at right-angles thereto, and which is in turn driven by gearing 141, the pinion of which latter is fixed on the drive-shaft 18 previously described, whereby the shafts 71 and 137 are driven in opposite directions. The shaft 137 is provided at its outer end with a cam 142 which has an eccentric cam-groove 143 for engaging the roller 144 carried on the lower end of the reciprocating slide 133, whereby the rotation of the shaft 137 causes the member 133 to slide up and down. The construction and arrangement are such, it will be understood, that the reciprocating movements of the member 133 are properly timed relative to the movements of the other elements of the machine, especially the rotating cage or turn-table which carries the forms around the machine. At the proper time, therefore, which is when the end-portion 129 of the punch enters the recess 130, the slide 133 moves downward, and the punch 117 is depressed by the roller 132 (see Fig. 21), so that the hole in the top of the container is punched in the desired manner. This is done without stopping the rotary motion of the cage which carries the forms upon which the containers are carried, as the upper end-portions 129 of the punches are free to move forward in the recesses 130 during each punching operation. Each form 44 has allotted thereto a vertical rod 145, which rods are disposed immediately behind said forms, and which slide up and down in the guides 146 and 147, these guides being carried respectively on the rings 23 and 13, and each rod having a shoulder 148 disposed thereon between said rings. Each rod 145 has a spring 149 disposed thereon between the bottom of the bearing 146 and the top of the shoulder 148, whereby these springs tend normally to yieldingly maintain the rods 145 in their depressed positions. The lower end of each rod 145 is provided with a horizontally disposed lever-arm 150, the inner ends 151 of which are adapted to engage the roller 152 which is mounted on a stationary portion of the machine adjacent the front end-portion 128 of the track 127, so that each rod 145 is partially rotated immediately after the clamp 112 at its upper end is brought down upon the top of the container. It will be seen that the upper end-portion of each rod 145 is T-shaped (see Fig. 13), and this T-shaped head 153 is adapted to engage the oppositely inclined bevels 154 and 155 on the top of the clamp-arm 156, these bevels being disposed at opposite sides of the opening 157 in said arm. Each time an arm 151 engages a roller 152 the rod 145 of such arm is partially rotated, thereby causing the head 153 to engage the bevels 154 and 155, and as the two end-portions of the T-shaped head slide upward on these bevels, in a manner that will be readily understood, the rod 145 is slightly raised against the tension of the spring 149, whereby the clamp 112 is not only locked against upward movement, by the T-shaped head 153, but is also subject to a downward compressive pull by said spring, so that the glued top of the container is held under compression between the top of the form and the bottom of the clamp, thus causing the top of the container to have the desired convex shape. However, as soon as the punch 117 has performed its operation, it is then necessary to release the container, and this is accomplished by a roller 158 which is mounted on an arm 159 which projects from the inner side of the guide 135, so that each outer arm 160 of the levers 150 is adapted to strike this roller immediately after the punching operation. Each time, therefore, that an arm 160 engages the roller 158, just after the punch 117 has been depressed by the roller 132, the rod 145 of such arm 160 is partially rotated in the opposite direction, thus restoring the T-shaped head 153 to a position parallel with the bevels 154 and 155, so that this T-shaped head can pass through the opening 157 when the clamp 112 is raised to release the container. When thus automatically unlocked, the clamp 112 is raised into its elevated position (see Fig. 13), by the engagement of the roller 126 (allotted to such clamp) with the beveled end-portion 161 of the semi-circular track 162 which is arranged at the front side of the machine (see Figs. 3 and 31), and the clamp remains in elevated position while the roller 126 continues to engage the under side of this track, which is until the form 44 upon which this particular container was carried can pass the gluing and folding device previously described.

The top of the container having been glued and folded and punched, this particular container, the making of which has thus far been followed through the above steps thereof, is now ready to be transferred to those portions of the machine by which the bottom flaps of the container are glued and folded. Immediately before this is done, however, the roll 60 of the form upon which the container is carried passes into the cam-shaped guide 163 (see Fig. 32), which guide is suitably mounted on a stationary portion of the machine, approximately at the front side thereof, and a little to the left of the place where the partially formed containers are first inserted in the machine. This guide 163 is for the purpose of slightly raising the sleeve 48, and then lowering it below its former position so as to slightly raise the container, thus loosening the container on the form, both operations being desirable in case the glue or adhesive has caused the top flaps to adhere to either the top of the form 44 or the top of the sleeve 48. If the top of the container adheres to the top of the form, it will be detached therefrom by the action of the guide 163, and the container will immediately settle back into position on the form before the container is transferred to the instrumentalities above by which the bottom flaps are glued and folded. At the front of the machine, the stationary body-frame is provided with a pair of upright guides 164 and 165, and with a cross-head 166 which slides up and down in said guides. The shaft 140 is provided with a crank-plate 167 connected by a pitman 168 with said cross-head, so that for each complete rotation of said shaft the said cross-head slides up and then down again, in a manner that will be readily understood. The guides 165 are connected by the rigid cross-piece 169, and a vertical bar 170 is arranged to slide up and down in this cross-piece, and in the cross-head 166, through the up-and-down movements of said cross-head. The guide 165 has its inner edge provided with rack-teeth 171, and the opposite edge of the bar 170 is provided with rack-teeth 172, and a pinion 173 is mounted on the cross-head (preferably on the pivot 174 of the pitman 168) to engage these two racks, whereby when the cross-head 166 moves upward at a certain speed the bar 170 will move upward at approximately twice such speed, so that this bar will have a comparatively long stroke up and down, notwithstanding the comparatively short stroke of the crank by which the pitman 168 is operated. The bar 170 is provided with a transverse guide 175, rigidly secured thereto at a point above the cross-head 166, and this guide 175 is in position to receive the roll 60 just after the latter leaves the guide 163, the two guides being practically in alinement at such time. Depending from the upper ring 35 of the rotary cage or turn-table, there are a plurality of vertical rods 176, each rod being disposed above and directly in line with the vertical axis of one of the forms 44 below. These rods are removably held in place by nuts 177 screwed on to their upper ends. Each rod 176 is provided with a head 178 which slides up and down thereon, and which also slides up and down on the rods 39, each head 178 having a cavity 179 in its lower end. For each head 178 there is a rectangular collar 180 fixed on the ring 29, so that when these heads slide downward they enter these collars. Each head 178 is provided with a pair of depending fingers 181 which are pivoted on the heads at 182, and each having their upper ends provided with compression springs 183, whereby the lower ends of these fingers are yieldingly held against outward movement away from each other. Each finger is provided with a gripping-portion 184, and with a cam-portion 185 immediately below said gripping-portion. At its outer side, each head 178 is provided with a roller 186 and each rod 176 is provided with a pair of vertically-disposed members 187 which slide up and down in grooves formed in said rod. These members 187 are provided near their upper ends with a rigid collar 188, which is removably secured to said members by screws 189 and 190, and each collar 188 is provided with a roller 191, the rollers 191 and the rollers 186 being disposed in line vertically. The lower ends of the members 187 are provided with pivoted links 192, and the two bell-crank-shaped levers 193 are pivoted at 194 on the lower end of the rod 176, in a slot formed in the rod for this purpose. The links 192 are pivotally connected with the bell-crank-shaped levers 193 (see Fig. 33) and said levers are provided with notches 195 for engaging the transverse pin 196 which is inserted through the rod 176, and which coöperates with said notches 195 to hold the parts firmly in operative position, when the members 187 are moved upward relative to the rod 176 (see Fig. 17), but which permits the engaging-portions 197 of said bell-crank levers to come flatwise together (see Fig. 33) when the members 187 are moved downward. The mechanism thus carried at the lower end of each rod 176 is adapted to enter the cavity 179 in each head 178, when in the condition shown in Fig. 33, and when the heads 178 are moved downward, this mechanism is also adapted to enter the container through the opening 9 in the top thereof. The clamps 198 are pivoted on the under side of the ring 29, so that each clamp is in position to swing upward and bear with its engaging-portion 199 against the bottom of the container (after the latter is transferred to its upper position), and each clamp is pivoted at 300 and connected by a pivoted link 301 with the arm 302, which latter is rigid with the arm 120 previously described, so that each clamp 112 is coupled to one of the clamps 198 above. Consequently, each time a clamp 112 moves downward upon the top of one of the containers, the connected clamp 198 above swings upward to engage the bottom of the container above. The clamps 198 are each provided with an opening 303, and with oppositely inclined bevels 304 and 305 at opposite sides of this opening, parallel with the length of the clamp.

The rods 306 are movable up and down and in a rotary manner in the vertical guides or bearings 307 on the upper ring 35, and in the guides 308 in the ring 29, each rod being disposed in position to extend downward through the opening 303 of the corresponding clamp. A spring 309 is mounted on each rod 306, between the ring 29 and the shoulder 310 on the rod, so that downward movements of these rods compress said springs. The lower end of each rod 306 is provided with a T-shaped head 311, and when these rods are rotated, after the clamps 198 are raised, the T-shaped heads engage the bevels 304 and 305 to draw the oscillating engaging-portions 199 tightly against the bottoms of the containers. Before this, however, the containers must be elevated from the forms 44 to their positions above, by means of the vertically reciprocating guide 175, which is accomplished in the following manner: When the roller 60 of the sleeve 48 of the particular container arrives in the guide 175, the pitman 168 begins to move upward, and through the medium of the pinion 173 the bar 170 is moved upward twice as fast as the cross-head 166, thus carrying the cross-head 49 and its sleeve 48 with the container thereon upward until the container reaches a position immediately below the head 178 which is located above this particular form (see Fig. 33), so that the bell-crank-levers 193 are in position to enter the opening 9 in the top of the container.
At this time the top of the container engages the lower edges of the head 178, and the upward motion continuing, the container passes through the square collar or guide 180, it being understood that during this time the roller 60 is traveling forward in the guide 175, which latter is moving upward. The gripping-portions 184 of the fingers 181 take hold of the upper portion of the container, as the latter passes upward through the guide or collar 180. At about this time the roller 191 engages the beveled end or incline 200 of the track 201, which is circular and extends around the machine, being supported by the stationary brackets 202 depending from the spider 41, and when the roller rides onto this track the members 187 are raised, thereby causing the bell-cranklevers 193 to move apart at their lower ends in a manner which permits them to enter the container through the opening 9, and the continued upward movement of the head 178 finally brings the bottom of the container into such position that the bottom flaps of the container can be folded up against the flat faces of the portions 197, as will hereinafter more fully appear. The slots 59 provide clearance for the ends of the portions 197 as the sleeve 48 withdraws from the bottom of the container. The upward movement of the head 178 is accomplished by the engagement of its roller 186 with the inclined track 203, which latter leads upward to the horizontal track 204 which is circular in form and which extends a distance around the machine. The roll 191 is assisted onto the track 201 by engagement with the pivoted arm 205, the latter having a roller 206 which is engaged by the cam 207 on the bar 170, so that at the proper time the arm 205 is raised by the cam 207 to thereby raise the roll 191 to accomplish the desired result. A spring 208 connects the arm 205 with a stationary portion of the body-frame, said arm being pivoted at 209 on the body-frame, and being provided with a portion 210 which carries an adjustable set-screw to bear against the adjacent bracket 202, thereby to limit the downward movement of the free end-portion of this arm 205, under the tension of said spring. An arm 211 is pivoted on the body-frame at 212, and provided with a set-screw 213 to engage the cross-piece 169, thereby to limit the downward movement of this arm 211, which latter is connected by a spring 214 with a stationary portion of the body-frame, so that said arm is held in its normal position by said spring. At the proper time, however, the cam 215 on the bar 170 strikes the roller 216 on the arm 211, and the latter engages the roller 186 to boost the latter up the inclined track 203, so that the head 178 is finally elevated to its highest position, with this roller 186 traveling on the horizontal track 204 previously described. As stated, the fingers 181 grip the container and hold the latter against the bottom of the head 178 which has thus been elevated, and the cross-head 49 and its sleeve 48 are then moved downward by the guide 175 until this roller is again in position to travel forward on the track 61, in the manner previously explained. The container which is thus being carried by one of the heads 178 travels forward until it arrives in position where the rotary folding device or finger 217 will act on the bottom flap 7 of the container (see Fig. 14), it being observed that this device 217 is mounted on the upper end of the shaft 76 previously mentioned, so that the two devices 77 and 217 rotate in unison, and whereby the lower device is acting upon the top of one container while the upper device is operating upon the bottom of another container. The rotation of the device 217 continues and causes it to bend the flap 6 outward. As the container moves forward the bottom flap 8 is folded in position by the folding element 218, which latter is disposed immediately above the previously described folding device 79, and at the same time the flap 6 travels onto the upper surface of the lateral projection 219 of said folding device. This leaves the flap 5 hanging downward, and the flap 6, as the container moves forward, passes off from the upper surface of the lateral projection 219 and between the upper and lower glue-rolls 220 and 221, which latter are mounted upon a suitable portion of the body-frame and connected together by the gear-wheels 222, said lower glue-roll having its shaft provided with a bevel-gear 223 which engages the bevel-pinion 224 on the previously described shaft 70, so that all of the glue-rolls are operated by this vertical shaft. The glue-roll 221 receives the glue or other adhesive from the receptacle 225, which is suitably supported on the body-frame, and which is provided with an adjusting screw 226 by which it can be moved toward and away from said roll, thereby to regulate the supply of adhesive to the two rolls. It will be understood, of course, that the adhesive thus supplied to the roll 221 is also supplied therefrom to the roll 220, before the flap 6 passes between the two rolls, so that this flap has the adhesive applied to both surfaces thereof. The front end of the device 218 is shaped like the previously described portion 80, except that it is bent downward, of course, instead of upward, and the rear end of the device 218 is like the portion 82 previously described, whereby the short bottom flaps are held in folded position after the gluing and preliminary to the folding of the long flaps. The folding finger 227 is mounted on a transverse shaft 228 (see Figs. 12 and 28), which shaft has a bevel-pinion 229 that engages the bevel-wheel 230 on the upper end of the previously described shaft 89, whereby the fingers 83 and 227 ore operated simultaneously. The finger 227 is provided with narrow-edged rollers 231 to engage the flap 6 and bend the latter upward against the flaps 7 and 8, as the container moves along, in the same manner that the rolls 85 previously operated upon the glued flap of the top of this same container. A lever 232 is pivoted on the body-frame at 233 and connected by a link 234 with the bell-crank 99, and is connected by a spring 235 with a stationary portion of the body-frame. The upper end of the lever 232 is provided with a pivoted block 236 in which is solidly mounted the rod 237 provided at its end with the folding finger 238, which latter is like the finger 108 previously described. After the operation of the finger 227, the finger 238 then pulls the flap 5 upward against the flap 6, the block 236 tilting about its pivot on the upper end of the arm 232, against the tension of a spring 239 which acts with respect to this folding finger in the same manner that the spring 107 controls the finger 108 previously described. The bottom flaps thus glued and folded, now slide upon the upper edge of the guard or member 240, which latter is like the guard 109 previously described, so that during the time this container is sliding forward on the upper guard 240 another container down below is sliding forward below the guard 109, and when the machine is full or running to full capacity the top of one container is thus glued and folded each time the bottom of some previous container is glued and folded. As the cage or turn-table revolves, the upper container in question passes off from the guard 240, and at about the same time the clamp 198 opposite this particular container swings upward to engage the bottom thereof (see Figs. 16 and 17), and the roller 186 rides under the track 241 (see Fig. 2), whereby the head 178 is held firmly down upon the top of the container as the latter travels around the rear side of the machine. The bottom of the container is tightly clamped between the self-adjusting portion 199 of the clamp and the flat faces of the engaging-portions 197, so that the flaps of the bottom are compressed to cause them to adhere through the medium of the adhesive. The track 201 terminates at 242, as from here on, during the compression of the bottom of the container, this track is not necessary. While the clamp 198 is in its raised position, it is held in this manner by the T-shaped head 311 previously described, the rod 306 having been turned so that said T-shaped head engages the two bevels at opposite sides of the slot 303, because of the engagement of the inner end-portion 243 of the cam-arm 244 on the upper end of the rod 306 with the roller 245 on the top of the stationary frame. The container moves along until the outer end-portion 246 of this cam-lever strikes the roller 247 which is located on the top of the body-frame near the front of the machine (see Fig. 7), whereby the rod 306 is twisted backward until its T-shaped head 311 can pass through the opening 303 in the clamp, thus permitting the latter to fall downward. At about the time the bottom of the container is released by the downward movement of the clamp 198, the roller 186 starts to ride down between the inclined guides 248 (see Fig. 32), thus causing the head 178 to begin moving downward on the rod 176, and pushing the container downward through the collar 180 until the cam-portions 185 of the fingers 181 engage the bevel 249 on said collar 180, thus moving said fingers out of engagement with the container. At this point in the operation the roller 191 runs into the throat of the cam-lever 250, which latter is pivoted on the body-frame at 251, and is provided with an upwardly projecting arm 252 for engaging the roll 253 on the vertically-reciprocating bar 170, which latter is in its upper position at this time, whereby the cam-portion 254 of the arm 252 is engaged by said roller to give the cam-lever 250 a sudden downward movement. This downward movement of the roller 191 causes a downward movement of the members 187, whereby the bell-crank-levers 193 are pushed downward and into engagement with each other (see Fig. 33), thus allowing the container to drop downward or release itself from this mechanism. A spring 255 connects the lever 250 with a stationary portion of the body-frame of the machine, so that said spring yieldingly resists the downward movement of said cam-lever, and serves to restore the latter to its normal or elevated position. Thus the upward movement of the cross-head 166 not only serves to raise the guide 175 and thereby elevate one of the lower traveling containers into the upper plane of movement, but serves also to operate the lever 250 and thereby fold the bell-crank-levers 193 together to permit their passage upward through the opening 9 of the container which is finished (see Figs. 32 and 33), so that this finished container then drops into the hopper 256, and from here the finished container travels upright on the belt 257 to any desired place of delivery more or less remote from the machine.

As shown and described, the machine is working with full-sized containers. For a smaller size, however, one of the sections of the inclined track 203 can be removed to permit the roller 186 to travel on the horizontal track 258, so that the head 178 will not be elevated as much as before. Also, for this purpose the roller 186 will finally find its way between the guide 259 and the under side of the lower guide 248 (see Fig. 32), and will then operate as previously described to force the head 178 downward to discharge the finished container. The rollers 186 which are not resting on containers (the containers having been omitted from these positions) will drop down and engage the track 260 and then move forward along this track until the heads 178 carried thereby are brought successively into position to receive containers from below, in the manner previously described. At the rear of the machine the rollers 186 of vacant positions will travel down the inclined track 261, thus allowing their heads 178 to move downward into their allotted collars 180 until they again arrive at the position where they can receive containers from below. For smaller containers, a section of the track 261 can be hinged to permit the rollers 186 to leave the track 258 and pass under the track 262 (see Fig. 2), under which latter they travel until they engage the lower edge of the lower guide 248, as previously described. For a still smaller container, a lower section of the inclined track 203 will be removed to permit the rollers 186 to travel on the horizontal track 263, and from the latter these rollers will pass under the track 264 at the rear of the machine, a lower section of the inclined track 261 being hinged for this purpose. In this way, the machine can be adjusted for different sizes of containers, but for each size the rollers 191, of course, will always operate as heretofore described, and will always travel, for example, on the track 201, inasmuch as the bottom of the container will always be at the same height, no matter what the size may be. Also, the roller 186, after leaving its lower position (see Fig. 32), will travel forward until it is again engaged by the lever 211, in the manner previously explained.

It will be understood, of course, that the various operative parts and instrumentalities are so proportioned and arranged that they operate at the proper time and in the desired sequence, to fold the top and bottom flaps of each container in the manner explained. The arm 265 on the shaft 89, previously described, is arranged to engage the adjacent portion 266 of the stationary body-frame to limit the rotation of the shaft 89 under the influence of the spring 94, thereby to govern the folding fingers 83 and 227, and causes them to come to rest in their normal or retracted positions. The machine operates with a continuous motion, but the cage or turn-table revolves slowly enough so that the operator or attendant standing at the front of the machine can easily place a fresh container on each form 44, immediately after the form has completed its travel around the machine and has been relieved of its previous container, by the transfer of the latter to the position above. In this way, and for each fresh container placed in the machine, a finished container will drop out from above and into the hopper and onto the conveyer-belt 257 which will carry it away from the machine.

When the roller 60, of any particular sleeve 48, rides up the incline 62 of the circular track 61, the container on this form is raised slightly, whereby the top flaps of the container are permitted to fold downward into a horizontal plane, which would not be possible with the top of the form above the upper edge of the sleeve 48, inasmuch as the top of the form is substantially convex. However, as soon as this roller has passed the lower group of folding devices, so that the top flaps have been folded, this roller then rides down the incline 267 of this track, then onto the low portion thereof, so that the folded top flaps are compressed by the clamp 112 (in the manner previously described) against the top of the form 44.

It will be seen, therefore, that the particular embodiment of the invention shown and described involves a rotating cage or turn-table which, with the devices supported thereby, constitutes a means for carrying the containers along successive paths of travel, each path being circular, and the second path being disposed above the first path. With this arrangement, the machine also comprises a first group of devices associated with the first path of travel to operate upon the top flaps, and a second group of devices associated with the second path of travel to operate upon the bottom flaps, in combination with mechanism to automatically transfer the containers from the first path of travel to the second path of travel, whereby it is unnecessary to handle or manually manipulate the containers between the operation of gluing and folding the top flaps and the subsequent operation of gluing and folding the bottom flaps. The cage or turntable formed by the several rings and the vertical rods 39 may be driven at any desired speed, but is preferably operated slowly enough to permit the attendant to place a container on each form 44, without missing any of the forms, so that when operating at its full capacity the machine will carry a container on each form, without any vacancies, except for the time required in which to supply a fresh container to any form after the partially completed container thereon has been transferred to the upper level or second path of travel. Each form 44, with its sleeve 48 and other parts, together with its clamp 112 and its rod 145 and other coöperating elements, constitutes one of the lower circular series of units which are mounted on the cage or turn-table. In a similar way, each of the vertically-sliding heads 178 and its allotted clamp 198, in combination with its pressing elements 193 and other related parts, and together with its allotted rod 306 and parts coöperating therewith, constitutes one of the upper circular series of units which are mounted upon the cage or turn-table. These upper units are, of course, each mounted directly above one of the lower units, so that the sleeves 48 of the lower units slide up to transfer the containers to the upper units, and so that the heads 178 slide downward to meet the top of each rising container, in the manner previously described. Thus, as stated, the entire operation of folding and securing the top and bottom flaps of each container is performed automatically and without the necessity of handling or manually manipulating the container, except that with the embodiment of the invention shown and described it is necessary to supply the containers to the machine by hand. However, after a container is once inserted in the machine, it is then handled and taken care of automatically until it is discharged from the machine with its upper and lower ends completed and formed in the desired manner.

Referring to Fig. 17, it will be seen that each clamp 199 has a convex boss 412 on the under-surface thereof, which rests in the concave seat 413 on the arm 198, thus making said clamp self-adjusting or oscillating to accommodate itself to the bottom of the container. It will be understood that for this purpose the retaining bolts 414 may be loosely held in the arm 198, but are rigid with the clamp 199, so that the latter has some rocking movement on its seat.

From the foregoing it will be seen that the containers are always vertical and right side up from the time they enter the machine until after they are finished and ready to be discharged in unfilled condition from the machine. The fastening of the flaps in place, in the manner explained, is all accomplished before the containers are filled with the substance or commodity which they are intended to hold, so that they are discharged from the machine in an empty condition. Moreover, the top flaps of the containers are closed first, and the bottom flaps afterward, so that the top of the container is formed in advance of the bottom thereof. The two circular paths of travel of the containers are raised one above the other, in different horizontal planes, and the shifting of the containers from the lower path of travel to the upper path of travel is entirely automatic, and is accomplished by raising the forms on which the containers are held, so that the means by which the containers are carried around in the first path of travel are actually brought temporarily into the second path of travel, in order to accomplish the transfer of the containers from the lower path of travel to the upper path of travel. Each upwardly shifted form is, it will be seen, practically immediately returned downwardly to its own path of travel and brought into position to receive a fresh container thereon.

What we claim as our invention is:—

1. A machine for folding and securing the top and bottom flaps of containers, comprising means to carry the containers along successive paths of travel, a first group of devices associated with one path of travel to operate upon the top flaps, mechanism to automatically transfer the containers from the one path of travel to the other, and a second group of devices associated with said other path of travel to operate upon the bottom flaps.

2. The said machine, as set forth in claim 1, in which said means include a rotary structure provided with a lower circular series of carrying units by which the upper ends of the containers are successively presented to said first group of devices, and having an upper circular series of carrying units by which the lower ends of the containers are successively presented to said second group of devices.

3. The structure of claim 2, each of said lower units being provided with a punch to form an opening in the top flaps of each container, said machine having means to successively operate said punches.

4. The structure of claim 2, each of said lower units being provided with clamping means for compressing the top flaps to cause the top of each container to bulge upward.

5. The structure of claim 2, each of said upper units being provided with means adapted to pass through a restricted opening in the top of the container and then expand to bear flatwise upon the bottom flaps after the folding thereof.

6. The structure of claim 2, said mechanism including a vertically-reciprocating member disposed in position to receive and successively carry upward one of the elements of each of said lower units, and said upper units having means to remove the containers from said elements of the lower units.

7. The structure of claim 2, each lower unit having means for clamping the top flaps after they are folded, and each upper unit having means for clamping the bottom flaps after the folding thereof.

8. The structure of claim 2, said lower units being each provided with a roller to engage said mechanism, and said machine including a circular cam-track for supporting said rollers to control their respective units.

9. The structure of claim 2, said upper units being each provided with upper and lower rollers, and said machine having tracks for engaging said rollers to automatically control the upper units.

10. The structure of claim 2, each of said lower units comprising a form with a vertically-movable sleeve thereon, rollers carried by said sleeves to successively engage said mechanism, a pivoted clamp for the top of each form, vertically-disposed rods mounted to move slightly up and down and oscillate in bearings on said structure, means on the upper ends of said rods to tightly lock the clamps upon the tops of the containers, and means to automatically raise and lower said clamps, said machine having provisions for automatically oscillating said rods to lock and unlock the clamps.

11. The structure of claim 2, said upper units each comprising a pivoted clamp, means to automatically operate said clamps to compress and release the lower ends of the containers, vertical rods having their lower ends provided with means to tightly lock said clamps upon the bottoms of the containers, and means to pass through the restricted opening in the top of each container and compress the bottom flaps against said clamps, said machine having provisions for automatically oscillating said rods to lock and unlock said clamps.

12. The structure of claim 2, each of said lower units being provided with a vertically-sliding element to carry the container upward, and each upper unit having a vertically-sliding element which moves downward to meet the top of the rising container while passing said mechanism.

13. The said machine, as set forth in claim 1, in which instrumentalities are provided for applying an adhesive to the opposite surfaces of one top flap of each container, and for also applying an adhesive to the opposite surfaces of one bottom flap of each container.

14. The said machine, as set forth in claim 1, in which instrumentalities are provided for supplying an adhesive to the surfaces of some of said flaps, and in which said devices are provided with fingers to fold the flaps together after the application of the adhesive.

15. The said machine, as set forth in claim 1, in which the second group of devices is arranged to operate upon the bottom of one container at the same time that said first group of devices is operating upon the top of another container.

16. The said machine, as set forth in claim 1, in which rolls are provided to apply an adhesive to some of said flaps, and in which some of said devices are arranged to operate upon certain of said flaps in advance of said rolls.

17. The said machine, as set forth in claim 1, in which each group of devices comprises a rotary finger to fold a short flap into position, a stationary element to fold another short flap into position, a finger with rollers to then fold a long flap upon the short flaps, and another finger to finally fold the remaining long flap into position.

18. The said machine, as set forth in claim 1, in which means are provided for operating said groups in unison.

19. The said machine, as set forth in claim 1, in which means are provided for loosening the container on the carrying means preliminary to the transfer thereof from the first path of travel to the second path of travel.

20. The said machine, as set forth in claim 1, in which said second path of travel is provided with tracks disposed at different heights, for containers of different sizes, and in which said means have provisions for accommodating and operating in conjunction with containers of different heights, so arranged that the tops of the containers always travel in the same horizontal plane while passing said first group of devices, and so that the bottoms of the containers always travel in the same horizontal plane while passing the second group of devices, regardless of the height of the containers.

21. The said machine, as set forth in claim 1, in which said means include a rotary cage disposed in position to rotate about a vertical axis, and in which one path of travel is above the other path of travel.

22. The said machine, as set forth in claim 1, in which said mechanism comprises a horizontally-disposed guide, and rack and pinion elements to reciprocate said guide up and down, one of said paths of travel being above the other.

23. The said machine, as set forth in claim 1, in which means are provided to automatically punch central openings in the top flaps before the containers are transferred to the second path of travel.

24. The said machine, as set forth in claim 1, in which instrumentalities are provided for discharging the finished containers from the second path of travel.

25. The said machine, as set forth in claim 1, in which the second path of travel is above the first path of travel, and in which said mechanism includes vertically-reciprocating cams and pivoted elements operated by said cams to assist in completing the transfer of each container from the lower path of travel to the upper path of travel.

26. The said machine, as set forth in claim 1, in which said devices include means for applying adhesive to certain of the flaps.

27. A machine for folding and securing the bottom flaps of containers, comprising means to automatically fold the short flaps inward and one of the long flaps outward, devices to apply an adhesive to the outwardly folded long flap, means to fold the adhesive flap on the short flaps and the other long flap on the adhesive flap, and means adapted to exert internal pressure on the bottom of the container.

28. A machine for securing the top and bottom flaps of containers, comprising means to carry the containers along successive paths of travel, means to compress the top flaps first, means to automatically transfer the partially formed containers from the one path of travel to the other, means to compress the bottom flaps last, and means to finally discharge the container in unfilled condition from the machine.

29. The structure of claim 28, the second path of travel being above the first path of travel, the said mechanism comprising a vertically-reciprocating member to transfer the containers from the lower path of travel to the upper path of travel.

30. The structure of claim 28, said paths of travel being circular and arranged one above the other, and each path of travel having means adjacent the starting point thereof to apply an adhesive to one of the flaps, so that when compressed the flaps adhere together, and said mechanism being disposed in position to successively remove the partially finished containers from the lower path of travel before each container has completed the circle of this path of travel.

31. A machine for folding and securing the flaps of containers, comprising coöperating means to fold two short flaps permanently inward edge to edge and one long flap temporarily outward, devices to apply an adhesive to the outwardly folded long flap, a pivoted finger provided with one or more rollers to automatically fold the adhesive flap against the short flaps, and means including a pivoted finger to fold another long flap against the adhesive flap to form a three-ply top.

32. A machine for securing the flaps of containers, comprising a pivoted clamp to bear against the outside of the superimposed flaps, means to engage the inside of said flaps to resist the pressure of said clamp, a locking device for said clamp, mechanism to automatically operate said clamp, and instrumentalities to automatically operate said locking device to lock and unlock said clamp.

33. The structure of claim 32, said locking device comprising a rod mounted to move endwise and to oscillate, and means on said rod to engage said clamp when the rod is partially rotated.

34. The structure of claim 32, said clamp having a punch to form a central opening in the flaps, and said machine having means for automatically operating said punch.

35. The structure of claim 32, said mechanism comprising a reciprocating connection extending downward from said clamp, and means to operate said connection at the lower end thereof.

36. The structure of claim 2, each of said upper units comprising a vertically-reciprocating head provided with pivoted fingers for lifting the containers from the lower units, a guide below said head, through which guide the container rises from the unit below, a vertically-disposed rod upon which said head slides up and down, means on the lower end of said rod to bear upon the bottom flaps, a clamp to bear against the under side of the bottom flaps, means to automatically move said head up and down, and means on said guide to engage said fingers when the head moves downward to release the container.

37. In a machine for closing the top and bottom flaps of containers, a lower unit comprising a form having a movable sleeve thereon to support the container for the closing of the top flaps, and an upper unit comprising a vertically-reciprocating head provided with pivoted fingers for removing the container from said sleeve, said machine having instrumentalities to automatically raise said sleeve to enable said fingers to grasp the container, and said upper unit having means to thereafter automatically release the container from said fingers.

38. The structure of claim 37, in combination with devices to automatically fold and secure the top flaps before the container is transferred to the upper unit, and devices to automatically fold and secure the bottom flaps after the container is lifted by said fingers from said sleeve.

39. The structure of claim 37, said lower unit having means for punching the central opening in the top flaps, and said upper unit having means for entering said container through said opening to bear against the bottom flaps.

40. In a machine for closing the top flaps of containers, a form to support the container, means to clamp the flaps upon the form, a punch disposed in position to form a central opening in said flaps, said form having a die opening to receive said punch, means to move said form in a forward direction, a device adjacent the path of travel of the form to engage the end of said punch, and means to automatically actuate said device to cause the operation of said punch while the container is passing said device.

41. The structure of claim 40, said punch being mounted in said clamp and having an adjustable head for engaging said device.

42. In a machine for closing the flaps of containers, a form to hold the container, a pivoted clamp to compress the flaps on the form, a punch in said clamp, and means to operate said punch to form a central opening in said flaps, said clamp having a self-adjusting pressure-plate to bear upon said flaps, and said plate and said form having openings to receive said punch.

43. The structure covered by claim 2, as specified, one or more of said upper units including a pivoted arm having a self-adjusting clamp thereon to engage the bottom flaps, means to move said clamp upward against the flaps, and means to hold the flaps down against said clamp.

44. The structure of claim 32, as specified, said clamp being loosely mounted for self-adjustment against the flaps.

45. The structure of claim 27, as specified, and a self-adjusting clamp to support said flaps against the pressure.

46. In a machine for use in making containers, the combination of means to carry the containers along successive paths of travel, with the containers maintained in the same position in both paths of travel, a first group of devices associated with the first path of travel to operate upon certain flaps of the containers, mechanism to automatically transfer the containers from the first path of travel to the second path of travel, and a second group of devices associated with the second path of travel to operate upon said other flaps of the containers.

47. In a machine for use in making containers, the combination of means to carry the containers along successive paths of travel, with the containers empty or unfilled in both paths of travel, a first group of devices associated with the first path of travel to operate upon certain flaps of the containers, mechanism to automatically transfer the containers from the first path of travel to the second path of travel, and a second group of devices associated with the second path of travel to operate upon certain other flaps of the containers.

48. In a machine for use in making containers, the combination of means to carry the containers along successive paths of travel, with the containers always right side up and vertical in both paths of travel, a first group of devices associated with the first path of travel to operate upon certain flaps of the containers, mechanism to automatically transfer the containers from the first path of travel to the second path of travel, and a second group of devices associated with the second path of travel to operate upon said other flaps of the containers.

49. In a machine for use in making containers, the combination of means to carry the containers along successive paths of travel, with certain elements of the means for supporting the containers in the first path of travel adapted to be temporarily shifted into the second path of travel, so that the containers may be shifted from the end of the first path of travel to the beginning of the second path of travel, a first group of devices associated with the first path of travel to operate upon certain flaps of the containers, mechanism to automatically transfer the containers from the first path of travel to the second path of travel, and a second group of devices associated with the second path of travel to operate upon said other flaps of the containers.

50. In a machine for use in making containers, the combination of means to carry the containers along successive paths of travel, with said paths of travel disposed in different parallel planes, a first group of devices associated with the first path of travel to operate upon certain flaps of the containers, mechanism to automatically transfer the containers from the first path of travel to the second path of travel, and a second group of devices associated with the second path of travel to operate upon said other flaps of the containers.

Signed by us at Monroe, Michigan, this 31st day of October, 1917.

WILLIAM HARRY RAY.
PAUL BANCROFT PIERCE.